US009302933B2

(12) United States Patent
Myers et al.

(10) Patent No.: US 9,302,933 B2
(45) Date of Patent: Apr. 5, 2016

(54) METHOD FOR TEXTURING A GLASS SURFACE

(71) Applicant: Corning Incorporated, Corning, NY (US)

(72) Inventors: Timothy Edward Myers, Painted Post, NY (US); Vasudha Ravichandram, Painted Post, NY (US); Christine Coulter Wolcott, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 224 days.

(21) Appl. No.: 13/900,659

(22) Filed: May 23, 2013

(65) Prior Publication Data

US 2013/0323468 A1 Dec. 5, 2013

Related U.S. Application Data

(60) Provisional application No. 61/652,498, filed on May 29, 2012.

(51) Int. Cl.
C03C 15/00 (2006.01)
C03C 17/00 (2006.01)
C03C 21/00 (2006.01)

(52) U.S. Cl.
CPC ............... C03C 15/00 (2013.01); C03C 17/00 (2013.01); C03C 17/006 (2013.01); C03C 17/007 (2013.01); C03C 17/008 (2013.01); C03C 17/009 (2013.01); C03C 21/00 (2013.01); C03C 2217/43 (2013.01); C03C 2217/77 (2013.01); C03C 2218/115 (2013.01); C03C 2218/33 (2013.01); C03C 2218/34 (2013.01); Y10T 428/24372 (2015.01)

(58) Field of Classification Search
None
See application file for complete search history.

(56) References Cited

U.S. PATENT DOCUMENTS

| 4,664,748 A | * | 5/1987 | Ueno et al. ...................... 216/51 |
| 4,921,626 A | | 5/1990 | Rhodenbaugh ............... 252/79.4 |
| 5,415,731 A | * | 5/1995 | Kim ................................. 216/97 |

(Continued)

FOREIGN PATENT DOCUMENTS

| EP | 1027157 | 8/2003 | ............... B01J 37/00 |
| WO | WO02/053508 | 7/2002 | ............... C03C 15/00 |

(Continued)

OTHER PUBLICATIONS

T.H. Fedynyshyn et al. "Changes in Resist Glass Transition Temperatures due to Exposure", Proc. of SPIE vol. 6519, year 2007, paper 651917.*

(Continued)

Primary Examiner — Jiong-Ping Lu
(74) Attorney, Agent, or Firm — John L. Haack

(57) ABSTRACT

A method of making an article having a textured glass surface, including, for example:
attaching microencapsulated particles to a portion of a glass surface of the article; and
contacting the glass surface having the attached microencapsulated particles with an etchant to form the textured surface.
A glass article prepared by the method including: at least one textured surface having excellent haze, distinctness-of-image, surface roughness, and uniformity properties, as defined herein.
A display system that incorporates the glass article, as defined herein, is also disclosed.

16 Claims, 7 Drawing Sheets

(56) References Cited

U.S. PATENT DOCUMENTS

| | | | |
|---|---|---|---|
| 5,635,548 A | 6/1997 | Kittle et al. | 523/220 |
| 5,989,450 A | 11/1999 | Kim | 252/79.4 |
| 6,807,824 B1 | 10/2004 | Miwa | 65/31 |
| 6,833,185 B2 | 12/2004 | Zhu et al. | 428/323 |
| 7,393,385 B1 | 7/2008 | Coffey et al. | 95/59 |
| 7,666,511 B2 | 2/2010 | Ellison et al. | 428/426 |
| 7,749,670 B2 | 7/2010 | Patel et al. | 430/108.4 |
| 8,075,999 B2 | 12/2011 | Barefoot et al. | 428/410 |
| 8,158,563 B2 | 4/2012 | James et al. | 507/269 |
| 8,232,218 B2 | 7/2012 | Dejneka et al. | 501/68 |
| 2009/0176015 A1* | 7/2009 | Nakanishi et al. | 427/162 |
| 2010/0027126 A1 | 2/2010 | Chen et al. | 359/601 |
| 2010/0103524 A1 | 4/2010 | Spatz et al. | 359/585 |
| 2011/0267698 A1 | 11/2011 | Guilfoyle et al. | 359/609 |
| 2012/0221264 A1 | 8/2012 | Gollier et al. | 702/60 |

FOREIGN PATENT DOCUMENTS

| | | | |
|---|---|---|---|
| WO | WO2009/070237 | 6/2009 | C03C 3/091 |
| WO | WO2010/117673 | 10/2010 | C03C 15/00 |
| WO | WO2011/022639 | 2/2011 | C03C 3/091 |
| WO | WO2011/022661 | 2/2011 | C03C 3/091 |
| WO | WO2011062791 * | 5/2011 | H01L 31/0256 |
| WO | WO2011/137141 | 11/2011 | C03C 3/087 |

OTHER PUBLICATIONS

Yang, Dry particle coating for improving the flowability of cohesive powders, *Powder Technology*, 158 (2005) p. 21-33.

International Search Report and Written Opinion, dated Oct. 1, 2013, PCT/US2013/041792, International Filing Date May 20, 2013.

* cited by examiner

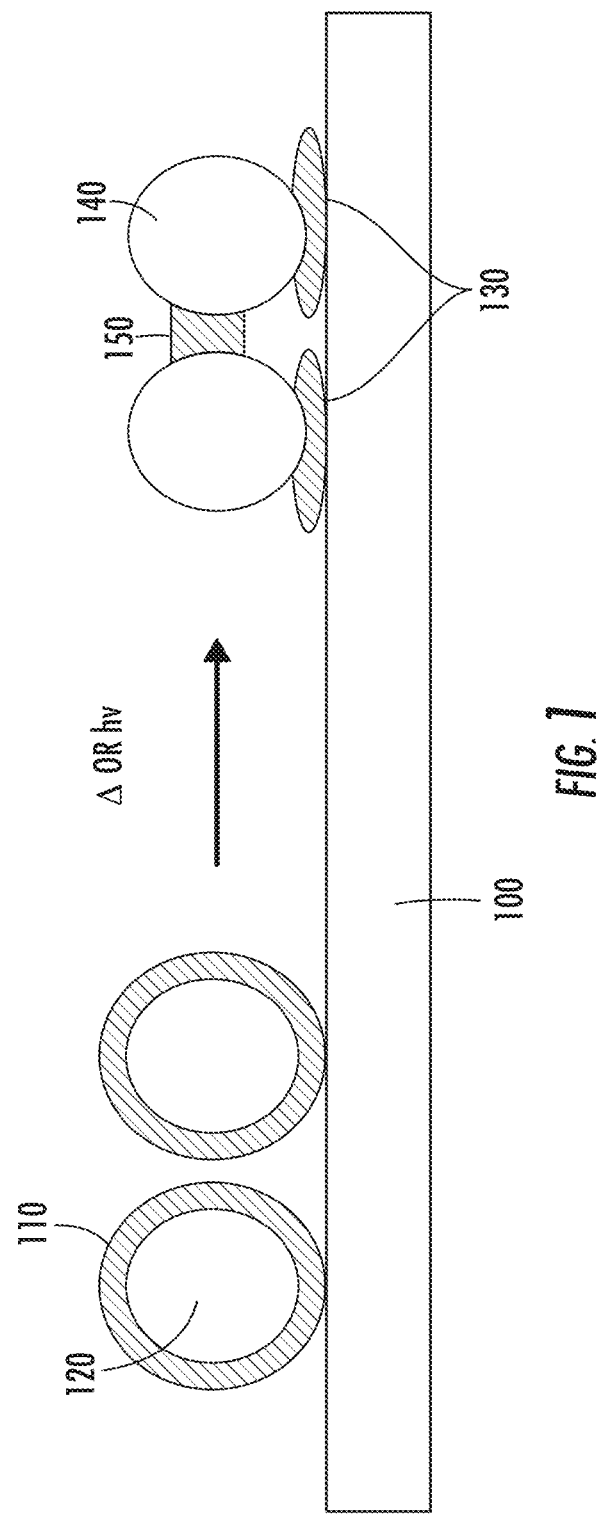

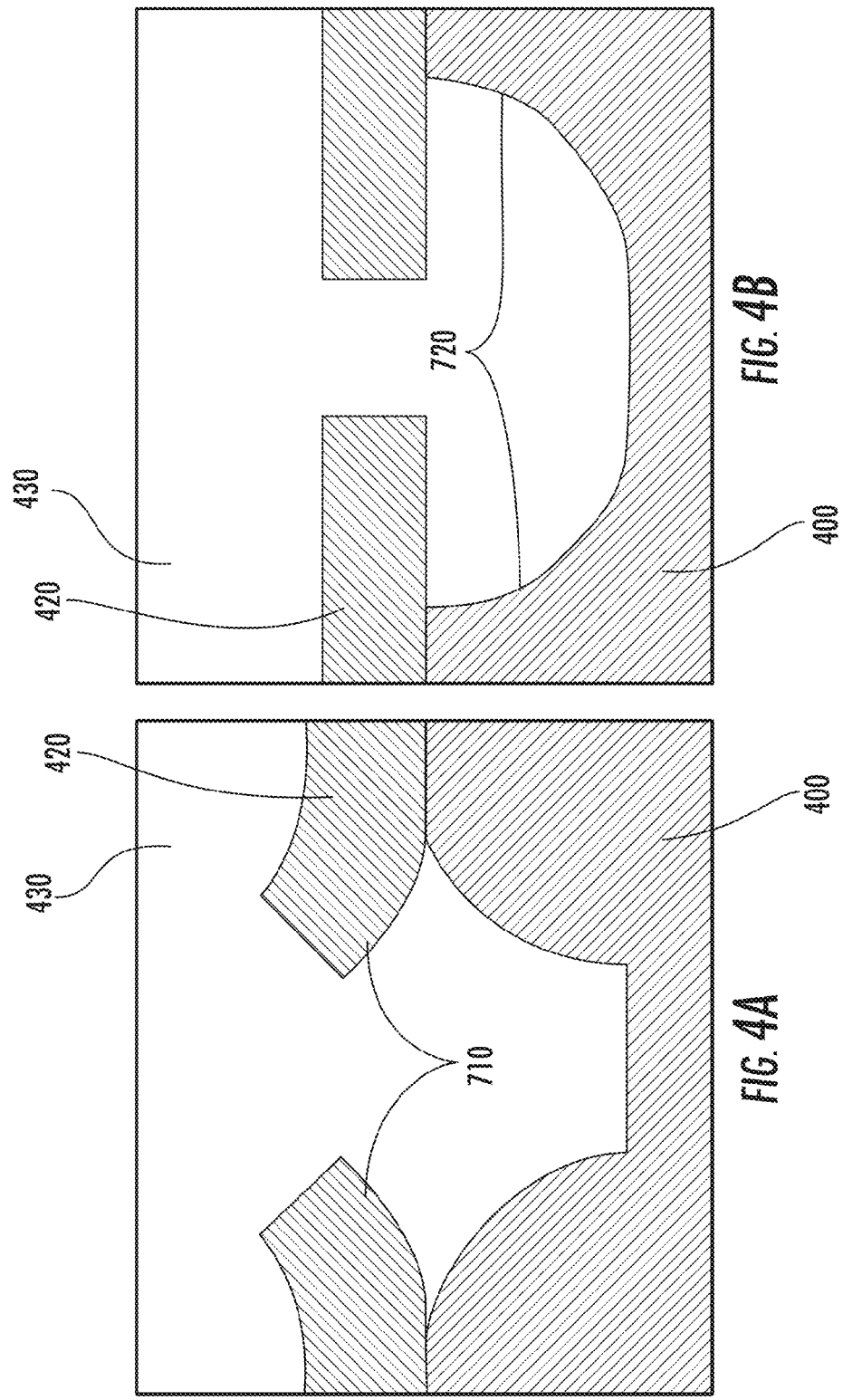

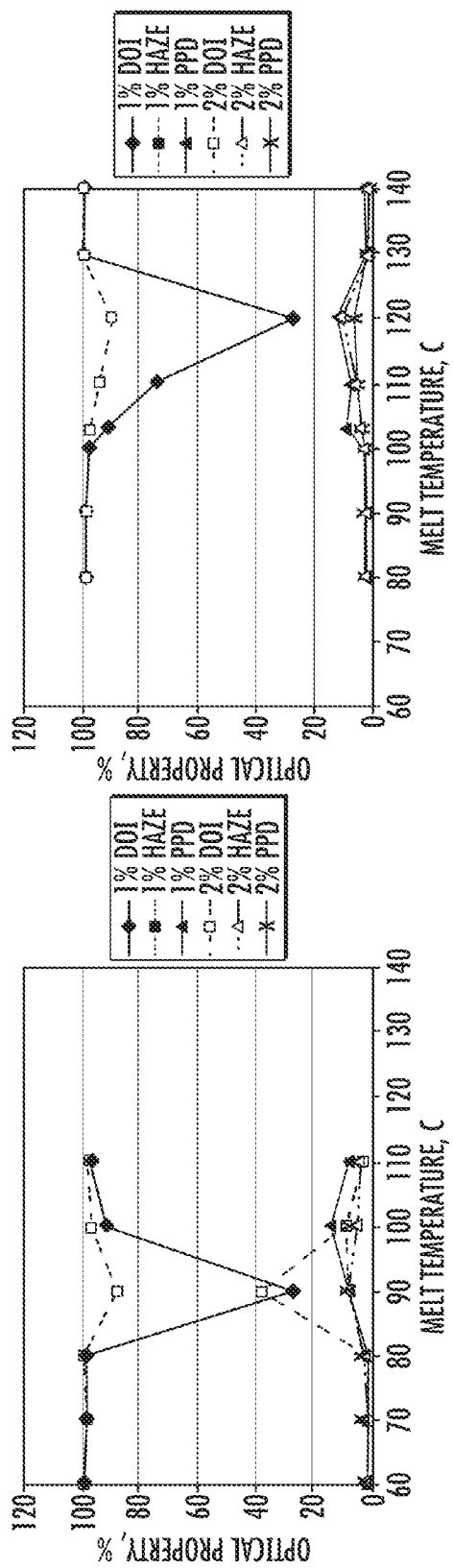

METHOD FOR TEXTURING A GLASS SURFACE

CROSS-REFERENCE TO RELATED CO-PENDING APPLICATION(S)

This application claims the benefit of priority under 35 U.S.C. §119 of U.S. Provisional Application Ser. No. 61/652,498, filed May 29, 2012, the content of which is relied upon and incorporated herein by reference in its entirety.

This application is related to commonly owned and assigned U.S. patent application Ser. No. 13/090,561, filed Apr. 20, 2011, entitled "Anti-Glare Surface Treatment Method and Articles Thereof"; and U.S. Provisional Patent Application Ser. No. 61/484,326, filed May 19, 2011, entitled "ANTI-GLARE GLASS ARTICLES AND DRY-MASK METHOD OF MAKING", but does not claim priority thereto.

The entire disclosure of any publication or patent document mentioned herein is incorporated by reference.

BACKGROUND

The disclosure relates generally to methods of making and using a textured glass surface, such as having anti-glare surface properties and to articles thereof.

SUMMARY

The disclosure provides a method for application of acid etch particulate mask for texture and optical property modification of a glass surface. The disclosure also provides a method of making an anti-glare (AG) surface texture, articles made by the method, and a display system incorporating the article having the anti-glare surface texture.

BRIEF DESCRIPTION OF THE DRAWING(S)

In embodiments of the disclosure:

FIG. 1 shows a schematic of an exemplary mononuclear microencapsulated bead or particle having a wax shell on a substrate before (left) and after (right) heating or irradiation.

FIGS. 4A and 4B show etch profile diagrams comparing a nondurable resist (4A; left) with a durable resist (4B; right).

Figure 5B:
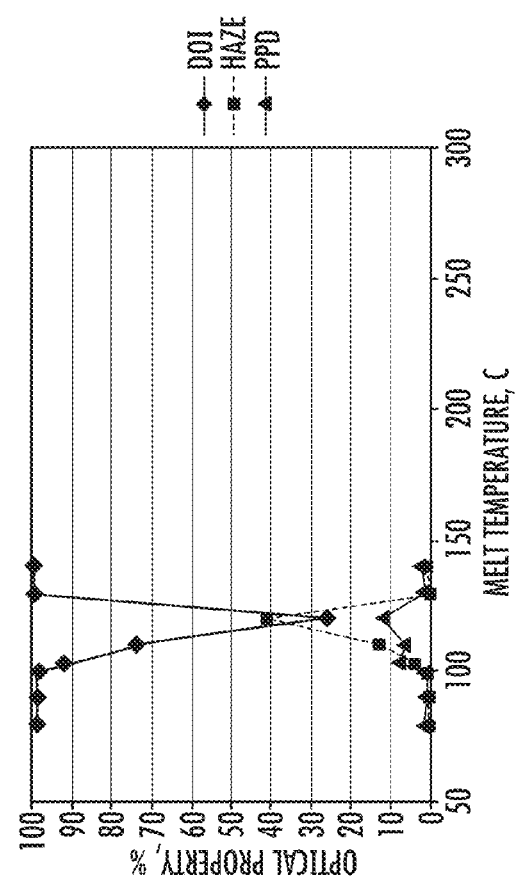
Figure 5A:
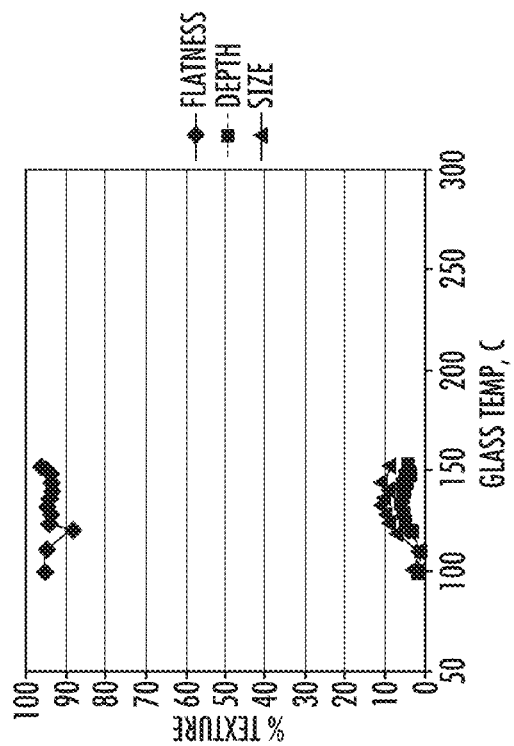

FIGS. 5A and 5B respectively show the effect of the attachment heating temperature on texture, and on three optical properties of glass (DOI, haze and PPD) after powder coating solid comparative wax particles (i.e., non-microencapsulated), heating, and etching.

FIGS. 6A to 6B show that a surface applied silica flow agent above a certain loading can positively modify adhesion of wax particles to glass.

FIGS. 7A to 7D show optical results from etched surfaces generated using microencapsulated beads of the disclosure having a polymer core and a lower melting polymer shell.

DETAILED DESCRIPTION

Various embodiments of the disclosure will be described in detail with reference to drawings, if any. Reference to various embodiments does not limit the scope of the invention, which is limited only by the scope of the claims. Additionally, any examples set forth in this specification are not limiting and merely set forth some of the many possible embodiments of the claimed invention.

In embodiments, the disclosed articles, and the disclosed methods of making and use provide one or more advantageous features or aspects, including for example as discussed below. Features or aspects recited in any of the claims are generally applicable to all facets of the invention. Any recited single or multiple feature or aspect in any one claim can be combined or permuted with any other recited feature or aspect in any other claim or claims.

DEFINITIONS

"Microencapsulated," "microcapsule," "micro encapsulated particles," "microencapsulated beads," or like terms refer to a particle or population of particles, having a regular or irregular shape, having dimensions of about 0.1 micron to 100 microns, and having a morphology such as mononuclear, polynuclear, matrix, or combination thereof, or mixtures thereof (see for example, Ghosh, S. K. (2006) Functional Coatings and Microencapsulation: A General Perspective, in Functional Coatings: by Polymer Microencapsulation (ed., S. K. Ghosh), Wiley-VCH Verlag GmbH & Co. KGaA, Weinheim, FRG). Additionally, the microcapsules can have one or more shells, and can form clusters of microcapsule particles. In embodiments, the microcapsules can be characterized as comprising at least two phases including a non-melting phase and a melting phase, the melting phase can be, for example, from about 1 to about 30 wt %, and the non-melting phase can be, for example, from about 99 to about 70 wt %, of the total weight of the two phases.

"Features" refer to, for example, contiguous areas of glass either differentially etched (e.g., pits), or higher elevation domains (e.g., mounds, plateaus, or "lands").

"Anti-glare", "AG", or like terms refer to a physical transformation of light contacting the treated surface of an article, such as a display, of the disclosure that changes, or to the property of changing light reflected from the surface of an article, into a diffuse reflection rather than a specular reflection. In embodiments, the surface treatment can be produced by mechanical, chemical, electrical, and like etching methods, or combinations thereof. Anti-glare does not reduce the amount of light reflected from the surface, but only changes the characteristics of the reflected light. An image reflected by an anti-glare surface has no sharp boundaries. In contrast to an anti-glare surface, an anti-reflective surface is typically a thin-film coating that reduces the reflection of light from a surface via the use of refractive-index variation and, in some instances, destructive interference techniques. Typical anti-reflection coatings do not diffuse light; the amount of light that is still reflected from an anti-reflection coating is specular and reflected images are still sharp, though with a lower intensity.

"Contacting" or like terms refer to a close physical touching that can result in a physical change, a chemical change, or both, to at least one touched entity. In the present disclosure various particulate attaching techniques, such as spray coating, dip coating, slot coating, and like techniques, can provide a particulated surface when particulated with particles as illustrated and demonstrated herein. Additionally or alternatively, various chemical treatments of the particulated surface, such as spray, immersion, dipping, and like techniques, or combinations thereof, as illustrated and demonstrated herein, can provide an etched surface when contacted with one or more etchant compositions.

"Distinctness-of-reflected image," "distinctness-of-image," "DOI" or like term is defined by method A of ASTM procedure D5767 (ASTM 5767), entitled "Standard Test Methods for Instrumental Measurements of Distinctness-of-Image Gloss of Coating Surfaces." In accordance with method A of ASTM 5767, glass reflectance factor measurements are made on the at least one roughened surface of the glass article at the specular viewing angle and at an angle slightly off the specular viewing angle. The values obtained from these measurements are combined to provide a DOI value. In particular, DOI is calculated according to equation (1):

$$DOI = \left[1 - \frac{Ros}{Rs}\right] \times 100 \quad (1)$$

where Rs is the relative amplitude of reflectance in the specular direction and Ros is the relative amplitude of reflectance in an off-specular direction. As described herein, Ros, unless otherwise specified, is calculated by averaging the reflectance over an angular range from 0.2° to 0.4° away from the specular direction. Rs can be calculated by averaging the reflectance over an angular range of ±0.05° centered on the specular direction. Both Rs and Ros were measured using a goniophotometer (Novo-gloss IQ, Rhopoint Instruments) that is calibrated to a certified black glass standard, as specified in ASTM procedures D523 and D5767. The Novo-gloss instrument uses a detector array in which the specular angle is centered about the highest value in the detector array. DOI was also evaluated using 1-side (black absorber coupled to rear of glass) and 2-side (reflections allowed from both glass surfaces, nothing coupled to glass) methods. The 1-side measurement allows the gloss, reflectance, and DOI to be determined for a single surface (e.g., a single roughened surface) of the glass article, whereas the 2-side measurement enables gloss, reflectance, and DOI to be determined for the glass article as a whole. The Ros/Rs ratio can be calculated from the average values obtained for Rs and Ros as described above. "20° DOI," or "DOI 20°" refers to DOI measurements in which the light is incident on the sample at 20° off the normal to the glass surface, as described in ASTM D5767, in this instance, the 'specular direction' is defined as −20°. The measurement of either DOI or common gloss using the 2-side method can best be performed in a dark room or enclosure so that the measured value of these properties is zero when the sample is absent.

For anti-glare surfaces, it is generally desirable that DOI be relatively low and the reflectance ratio (Ros/Rs) of eq. (1) be relatively high. This results in visual perception of a blurred or indistinct reflected image. In embodiments, the at least one roughened surface of the glass article has a Ros/Rs greater than about 0.1, greater than about 0.4, and greater than about 0.8, when measured at an angle of 20° from the specular direction using the 1-side method measurement. Using the 2-side method, the Ros/Rs of the glass article at a 20° angle from the specular direction is greater than about 0.05. In embodiments, the Ros/Rs measured by the 2-side method for the glass article is greater than about 0.2, and greater than about 0.4. Common gloss, as measured by ASTM D523, is insufficient to distinguish surfaces with a strong specular reflection component (distinct reflected image) from those with a weak specular component (blurred reflected image). This can be attributable to the small-angle scattering effects that are not measureable using common gloss meters designed according to ASTM D523.

"Transmission haze," "haze," or like terms refer to a particular surface light scatter characteristic related to surface roughness. Haze measurement is specified in greater detail below.

"Roughness," "surface roughness (Ra)," or like terms refer to, on a microscopic level or below, an uneven or irregular surface condition, such as an average root mean squared (RMS) roughness or RMS roughness described below.

"Gloss," "gloss level," or like terms refer to, for example, surface luster, brightness, or shine, and more particularly to the measurement of specular reflectance calibrated to a standard (such as, for example, a certified black glass standard) in accordance with ASTM procedure D523, the contents of which are incorporated herein by reference in their entirety. Common gloss measurements are typically performed at incident light angles of 20°, 60°, and 85°, with the most commonly used gloss measurement being performed at 60°. Due to the wide acceptance angle of this measurement, however, common gloss often cannot distinguish between surfaces having high and low distinctness-of-reflected-image (DOI) values. The anti-glare surface of the glass article has a one-side gloss (i.e.; the amount of light that is specularly reflected from only the front surface of a sample relative to a standard at a specific angle) of up to 90 SGU (standard gloss units), as measured according to ASTM standard D523, and in embodiments, can have a gloss in a range from about 60 SGU up to about 80 SGU. See also the above DOI definition.

"Adhere," "adhering," "anneal," "annealing," or like terms individually or collectively refer to the state or action of the deposited particles when caused to deform and subsequently further hold fast, bind to, stick to, and like associative descriptors, to the glass surface being treated, including particle-surface attraction or association (adhesion), particle-particle attraction or association (cohesion), and like interactions.

"Deform," "deformable," "deforming," or like terms generally refer to the state or act of the deposited particles when caused to adhere, such as by a change in the state or shape, to the glass surface or by other particles by, for example, thermalizing, e.g., thermal, mechanical, radiation, or like means.

"ALF" or "average characteristic largest feature size" or like terms refer to a measure of surface feature variation in the x- and y-directions, i.e., in the plane of the substrate, as discussed further below.

"Uniformity," "uniform," or like terms refer to the surface quality of an etched sample. Surface uniformity is commonly evaluated by human visual inspection at various angles. For example, the glass article sample is held at about eye level, and then slowly turned from 0 to 90 deg., under a standard, white fluorescent light condition. When no pin-holes, cracks, waviness, roughness, or other like defects can be detected by the observer, the surface quality is deemed "uniform"; otherwise, the sample is deemed not uniform. "Good" or "OK" ratings mean that the uniformity is acceptable or satisfactory with the former being subjectively better than the latter.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, and like values, and ranges thereof, employed in describing the embodiments of the disclosure, refers to variation in the numerical quantity that can occur, for example: through typical measuring and handling procedures used for preparing materials, compositions, composites, concentrates, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture. The claims appended hereto include equivalents of these "about" quantities.

"Consisting essentially of" in embodiments can refer to, for example:

a method of making an article having a textured glass surface, comprising: attaching microencapsulated particles to a portion of a glass surface of the article; and contacting the glass surface having the attached microencapsulated particles with an etchant to form the textured surface;

a glass article prepared by the foregoing process; or a display system that incorporates the prepared glass article, as defined herein.

The method of making the article, the article, the display system, compositions, formulations, or any apparatus of the disclosure, can include the components or steps listed in the claims, plus other components or steps that do not materially affect the basic and novel properties of the compositions, articles, apparatus, or methods of making and use of the disclosure, such as particular reactants, particular additives or ingredients, a particular agent, a particular surface modifier or condition, or like structure, material, or process variable selected. Items that may materially affect the basic properties of the components or steps of the disclosure or that may impart undesirable characteristics to the present disclosure include, for example, a surface having objectionable high glare or high gloss properties, for example, having a haze, a distinctness-of-image, a surface roughness, a uniformity, or a combination thereof, that are beyond the values, including intermediate values and ranges, defined and specified herein.

The indefinite article "a" or "an" and its corresponding definite article "the" as used herein means at least one, or one or more, unless specified otherwise.

Abbreviations, which are well known to one of ordinary skill in the art, may be used (e.g., "h" or "hr" for hour or hours, "g" or "gm" for gram(s), "mL" for milliliters, and "rt" for room temperature, "nm" for nanometers, and like abbreviations).

Specific and preferred values disclosed for components, ingredients, additives, and like aspects, and ranges thereof, are for illustration only; they do not exclude other defined values or other values within defined ranges. The compositions, apparatus, and methods of the disclosure can include any value or any combination of the values, specific values, more specific values, and preferred values described herein.

A display with a smooth glass surface can be difficult to view due to glare produced when light is reflected from its surface. Antiglare (AG) surfaces are preferred for many display applications (e.g., computer monitor, handheld devices, work pads, laptops, and like devices), since the amount of specular (mirror-like) reflection is reduced.

AG glass surfaces for displays can be produced by, for example, adding a polymer film to glass, coating the glass with a coat having AG properties, or by adding light-scattering texture to the customer facing glass surface. Of these examples, textured ion-exchanged glass is preferred since it is more scratch resistant than a polymer coating. One method to add texture to glass is to acid etch through a mask to selectively remove domains of glass.

In the above mentioned application, U.S. Ser. No. 61/484,326, disclosed etch masks contain particles having an average particle size of less than 20 micrometers. The particles can be adhered to the glass by various methods, and depending on type and chemistry of adhesion, can provide the acid resistant phase of an etch mask. The process of making AG glass surfaces with an acid etch can include, for example, providing clean glass; applying a mask layer; etching the masked surface; and optionally rinsing and drying the resulting textured glass surface.

Chemically strengthened glasses are used in many handheld and touch-sensitive devices as display windows and cover plates where resistance to mechanical damage can be significant to the visual appearance and functionality of the product. During chemical strengthening, larger alkali ions in a molten salt bath are exchanged for smaller mobile alkali ions located within a certain distance from the glass surface. The ion-exchange process places the surface of the glass in compression, allowing it to become more resistant to any mechanical damage it is commonly subjected to during use.

Reduction in the specular reflection, a significant factor in glare, from many display surfaces is often desired, especially by manufacturers whose products are designed for outdoor use where glare can be exacerbated by sunlight. One way to reduce the intensity of the specular reflection is to roughen the glass surface or cover it with a textured film. The dimensions of the roughness or texture should be large enough to scatter visible light, producing a slightly hazy or matte surface, but not too large as to significantly affect the transparency of the glass. Textured or particle-containing polymer films can be used when maintaining the properties (e.g., scratch resistance) of the glass substrate are not important. While these films maybe cheap and easy to apply, they are subject to easy abrasion which can reduce the display functionality of the device. Another shortfall of using films or coatings is that they can interfere with the operation of, or diminish the performance of certain touch-sensitive devices. Another approach to roughening the glass surface is chemical etching. U.S. Pat. Nos. 4,921,626; 6,807,824; 5,989,450; and WO2002/053508, mention glass etching compositions and methods of etching glass with the compositions. Wet etching is a method of generating an anti-glare surface on the glass while preserving its inherent mechanical surface properties. During this process, the glass surface is exposed to chemicals which degrade the surface to the correct roughness dimensions for the scattering of visible light. When micro-structural regions having differential solubility are present, such as in soda lime silicate glasses, a roughened surface can be formed by placing the glass in a (typically fluoride-ion containing) mineral acid solution. Such selective leaching or etching is generally ineffective at generating a uniform, anti-glare surface on other display glasses lacking such differentially soluble microstructural regions, such as alkaline earth aluminosilicates and mixed alkali borosilicates, and for alkali and mixed alkali aluminosilicates containing, for example, lithium, sodium, potassium, and like compositions, or combinations thereof.

In embodiments, the disclosure provides a method of making an article having an anti-glare surface, comprising, for example:

attaching microencapsulated particles to a portion of a glass surface of the article; and contacting the glass surface having the attached microencapsulated particles with an etchant to form the anti-glare surface.

The microencapsulated particles, prior to attachment, can be, for example, a particle having a core and a shell, the core melts at a higher temperature and has a higher acid resistance compared to the shell. The shell has a lower melting temperature (e.g., Tg) and a lower acid resistance compared to the core. The shell can have a Tg, for example, between 40° C. and the Tg of the glass substrate, such as 50° C. to 200° C., and preferably 60° C. to 160° C. The core can have a Tg, for example, of at least 10° C. above the Tg of the shell material, such as 10° C. to 100° C. above, and preferably 20 to 50° C. above, the Tg of the shell.

In embodiments, the attaching of the microencapsulated particles can be accomplished by, for example, depositing the particles on the glass surface then thermalizing (i.e., heating or irradiating) the attached particles. Thermalizing refers to, for example, thermal treatment of the deposited particles to maximize formability and attachment of the deposited particles. Formability refers to, for example, redistributing the shell material for the outer surface of the microencapsulated particle to between the particles, for example, bridging, and to between the particles and the surface to be etched. The thermalizing of the attached microencapsulated particles provides a temperature at or above the melt temperature of the shell and below the melt temperature of the core.

In embodiments, the core and shell can each independently be, for example, at least one of a polymer, a wax, or a combination thereof. The core can comprise at least one of a polymer, a wax, and like materials, or a combination thereof, and the shell comprises at least one of a polymer, a wax, and like materials, or a combination thereof. In embodiments, the core can alternatively be, or additionally include, for example, an inorganic material or a hybrid (e.g., inorganic-organic) material, such as a glass, a ceramic, a mineral, a sol-gel, and like materials, or combinations thereof.

In embodiments, the microencapsulated particles can further comprises a surface charge modifying component, e.g., a surface or bulk charge control agent additive, or like materials, to ensure reliable electrostatic surface charging properties and to provide resistance to changing environmental conditions that could degrade storage stability or be detrimental to the attachment process, such as high temperature and high humidity.

In embodiments, the microencapsulated particles, after attachment, can comprise, for example, a particle comprising a core and optionally a shell, the thickness of the shell, if present, on the core being substantially diminished or extinguished, and redistributed as a result of the attachment to between the deposited particles, between the deposited particles and the surface, or a combination thereof.

In embodiments, the attaching of the particles to the glass surface can be accomplished electrostatically.

In embodiments, the electrostatically attaching of particles to a portion of a glass surface of the article can be accomplished by, for example, charging the particles, charging the glass surface, or a combination thereof.

In embodiments, the glass surface can be, for example, at least one of a soda lime silicate glass, an alkaline earth aluminosilicate glass, an alkali aluminosilicate glass, an alkali borosilicate glass, a boroaluminosilicate glass, and like materials, or a combination thereof. In embodiments, the microencapsulated particles can be comprised of, for example, at least one wax, polymer, or a combination thereof, and the etchant can be comprised of, for example, at least one acid selected from HF, $H_2SO_4$, HCl, $HNO_3$, $H_3PO_4$, and like etchants, or a combination thereof.

In embodiments, the contacting with an etchant can be, for example, exposing the glass surface having the attached microencapsulated particles to the etchant for about 1 second to about 30 minutes, including intermediate values and ranges, including intermediate values and ranges, such as about 10 seconds to about 10 minutes, about 20 seconds to about 1 minute, and like exposures or intervals.

In embodiments, the disclosed microencapsulated particles can include, for example, a core-shell particle comprising a core having a Tg greater than the shell Tg. The core or shell can be, for example, at least one of a polymer, a copolymer, polymeric nano-particles, cross-linked polymer particles, UV cured polymer particles, a wax, or a combination thereof.

In embodiments, the attached microencapsulated particles can have, for example, a D50 diameter of from about 1 to about 30 micrometers, a shell glass transition temperature (Tg) of from about 25 to about 200° C., from about 35 to about 150° C., from about 40 to about 130° C., from about 50 to about 100° C., from about 55 to about 80° C., including intermediate values and ranges, and a core Tg of from greater than the shell Tg.

In embodiments, the attached microencapsulated particles on the surface can be, for example, a mono-layer to a multi-layer of particles, the layer having a dry thickness, for example, of from about 1 to about 200 micrometers.

In embodiments, the method can further comprise treating the resulting roughened surface with a low-surface energy coating, for example, a fluorinated compound, to reduce wetting and permit easy clean-up.

In embodiments, the method can further comprise washing the resulting anti-glare surface, chemically strengthening the anti-glare surface, and like treatments, or a combination thereof.

In embodiments, the method can further comprise, prior to etching, contacting at least another surface of the article with an optionally removable, etch-resistant protective layer that prevents etching in the protected area.

In embodiments, the disclosure provides a glass article prepared by any of the disclosed methods of making. The glass article can be, for example, a sheet of protective cover glass of a display device. In embodiments, the disclosure provides a display system comprising at least one glass article prepared by any of the disclosed methods of making.

The electrostatic particle application involves coating or deposition of microencapsulated polymer particles, or like particles, on a glass surface. Following the electrostatic application, the deposited microencapsulated particles, the glass article, or both, can be thermalized, that is energetically treated (e.g., thermally or photonically) to promote cohesion of the microencapsulated particles to one another, promote adhesion of the microencapsulated particles onto the glass surface, or both. The thermalized particulated surface is then etched with a suitable etchant, such as HF, or multi-component acid solution. The HF solution creates preferential etching around or about the thermalized particles on the glass surface to form an AG roughened surface layer.

The electrostatic attachment of microencapsulated particles to a portion of a glass surface of the article can be, for example, accomplished by charging the particles, charging the glass surface, or a combination thereof.

The electrostatic attachment of microencapsulated particles to a portion of a glass surface of the article can be, for example, contacting the glass surface with a charged aerosol of microencapsulated particles comprising a core comprising for example, polymer, polymer particles, particles comprised of a mixture of wax and polymer, a mixture of wax particles and polymer particles, or a combination thereof. The shell can be, for example, similarly comprised or constituted so long as the aforementioned Tg differential condition is satisfied.

The electrostatic attachment of microencapsulated particles to a portion of a glass surface of the article can be, for example, accomplished with an electrostatic particle sprayer, a corona electrode, a soot gun, a frictional charging element such as a rotating brush or like devices, and like particle or surface charging devices and methods known, for example, in the field of electrophotography, ionography, or solvent-less or powder paint systems, or a combination thereof.

The electrostatic attachment of microencapsulated particles can be, for example, accomplished with dry particles free of, for example: a binder; a rheology modifier; or a combination thereof. Alternatively, the electrostatic attachment of microencapsulated particles can be, for example, accomplished with the microencapsulated particles suspended in, for example, a non-dissolving apolar liquid, and electrostatically deposited on the glass substrate by applying, for example, various known liquid immersion development methodologies.

The glass surface can be, for example, at least one of a soda lime silicate glass, an alkaline earth aluminosilicate glass, an alkali aluminosilicate glass, an alkali borosilicate glass, a boroaluminosilicate glass, or a combination thereof, the particles are comprised of at least one wax, polymer, or a combination thereof, and the etchant comprises at least one acid selected from HF, $H_2SO_4$, HCl, $HNO_3$, $H_3PO_4$, or a combination thereof.

The attached microencapsulated particles on the surface, untransformed or transformed by thermalizing, can have, for example, a narrow (e.g., less than 10 microns particle size variation), a broad (e.g., several hundred to several thousand microns particle size variation), or intermediate particle size distribution.

In embodiments, the method can optionally further include, for example: removing any residual particles from the glass surface after the etching step; removing any protective film layers; or a combination thereof. The method can also optionally further include, for example, subsequent etching steps after the particles and any protective films have been removed from the glass. These subsequent etching steps may or may not further modify the surface roughness profile of the glass or the glass surface chemistry.

In embodiments, the disclosure provides a surface textured glass article prepared by the aforementioned process or any process permutations.

The resulting surface textured glass article can be, for example, a distribution of topographic features having a characteristic lateral period of about 1 to about 100 micrometers. Lateral period synonymously refers to the average characteristic largest feature size (ALF). ALF is the average cross-sectional linear dimension of the largest 20 repeating features within a viewing field on a roughened surface, and as further mentioned below.

In embodiments, the thermalizing, such as thermal treating or deforming the deposited deformable particles can be accomplished, for example, by heating, radiation, mechanical means such as a heated or unheated pressure roller, or like devices, or combinations thereof. The heating can be accomplished by any suitable means, such as thermal means, radiation means, pressure means, and like methods, or a combination thereof. Such heating means can include, for example, a heat gun, a hot gas knife, a convection oven, a heat lamp, a radiant heater, a press plate, a heated iron, a microwave source, and like means, or a combination thereof.

In embodiments, the electrostatically attaching microencapsulated particles on at least a portion of at least one glass surface of the article can be accomplished, for example, by contacting the at least one glass surface with wax particles, polymer particles, or a combination thereof. The contacting at least one glass surface with the microencapsulated particles can be accomplished with, for example, a gravity coater, an aerosol sprayer, a powder coater, electrostatic sprayer, and like devices, or combinations thereof.

In embodiments, the microencapsulated particle deposition or microencapsulated particle attachment can be accomplished by, for example, free of a binder; a rheology modifier; a solvent; a carrier liquid; and like materials, or a combination thereof. In embodiments, the microencapsulated particle deposition or microencapsulated particle attachment can be accomplished by, for example, including a charge control agent.

In embodiments, the deposited deformable microencapsulated particles can be, for example, a monolayer of particles, an ordered monolayer of particles, a bilayer of particles, an ordered bilayer of particles, and combinations thereof.

In embodiments, the method can further comprise, prior to etching, contacting at least another surface of the article with an optionally removable, etch-resistant protective layer.

In embodiments, the method can further comprise, after etching, washing the resulting textured surface, chemically strengthening the textured surface, or a combination thereof.

In embodiments, the disclosure provides a glass article prepared by any of the aforementioned processes including combinations or permutations thereof.

In embodiments, the glass article can have an anti-glare surface having, for example, a distribution of topographic features having, for example, an average diameter of about 1 to about 100 micrometers. A preferred diameter for topographic features can be, for example, from about 0.1 to about 20 micrometers, including intermediate values and ranges.

In embodiments, the disclosure provides a method to selectively etch a glass surface, to obtain features such as pits and mounds by acid etching, an acid resistant etch mask can be applied to glass first. The mask can have spatial features that vary in acid durability to provide areas of differential etch.

In embodiments, the glass article can be, for example, a sheet of protective cover glass of a display device.

In embodiments, a preferred haze, for example, for display-cover applications, can be, for example, less than about 10, an even more preferred haze can be, for example, about 6 to about 9, and an even more preferred haze can be, for example, about 5 to about 6 or below, including intermediate values and ranges. In embodiments, a preferred haze, for example, for non-display-cover applications such as appliances, mouse pads, light diffusers, decorative windows, and like articles, can be, for example, greater than about 30, an even more preferred haze can be, for example, about 35 to about 60, and an even more preferred high haze can be, for example, about 40 to about 80, including intermediate values and ranges.

In embodiments, the disclosure provides a coating and a wet etching process to form a nano- to micro-scale textured surface on a glass surface, such as silicate glasses. In embodiments, the process involves attaching by deposition or coating microencapsulated particles on the glass surface, followed by a thermal treatment at a relatively low temperature, for example, from about 30 to about 140° C., from about 35 to about 135° C., from about 40 to about 130° C., from about 45 to about 100° C., from about 50 to about 90° C., from about 55 to about 85° C., from about 60 to about 80° C., and like temperatures, including intermediate values and ranges, and for a sufficient time to promote deformation and adhesion of the particles onto the glass surface. The thermalized microencapsulated particulated surface is then etched, for example, in an HF, or multi-component acid solution. The etch solution creates preferential etching around deformed particles on the glass surface to form an AG roughened surface layer on the processed glass article. In embodiments, the process can involve deposition of charged microencapsulated particles on the glass surface. The particles are charged and can optionally be contained or suspended in an apolar liquid formulation, such as used in an electrophotographic printing ink and methods.

A known etching process to produce an anti-glare layer on a glass surface can involve at least three baths. For example, the first bath can contain ammonium bifluoride (ABF), for growing ABF crystals on the glass surface. The second bath can contain $H_2SO_4$ acid to remove the crystals. The third bath can be a mixture of $H_2SO_4$/HF to smooth the glass surface. Typical processing times, from start to finish for the three-bath process, can be for example, of about 60 about 80 minutes.

Corning, Inc., has developed an alternative process, as disclosed in commonly owned and assigned U.S. Ser. No. 13/090,561, which involves the use of a particle suspension. The particle suspension can be used to create a differential etching-mask when applied to the glass surface and followed by etching. This process is significantly faster, but is still more complex and costly compared to the presently disclosed process. The disclosed process can have significant benefits compared to the other processes. In embodiments, the disclosed method of making textured glass surfaces using dry powder coating or deposition of microencapsulated particles and etching provides several advantages over other methods (such as wet spray, wet slot die coating, and like methods) including, for example:

Coating Uniformity

Electrostatic attraction of particles to glass provides exceptional uniformity of the particle coating layer. The uniformity of the electrostatically deposited particle layer eliminates defects such as dewetting and "fish eyes" (observed in spray) and streaking (observed in slot die coating). Reduction in defects can enable a higher select rate and a more cost effective process. Generally, when defects are observed in the particle coating layer, such defects can be transferred to the glass surface following the acid etch. Particulates that are electrostatically sprayed can be sufficiently bound to glass by static charge to enable handling of the powder coated glass article. Since the particles can be statically attracted to glass, bridging of particles (as may be observed in wet spray) is disfavored. Whereas close particle-glass contact results in excellent uniformity of the particle coat and the resulting etched glass surface. At least two factors, such as flow agent and electrostatic charge, help to prevent agglomeration of particles on glass surface. Electrostatic spray coating methods can provide a drip-free application of a mask onto a curved or vertically mounted or oriented glass surface.

Scalability

Experimental samples were readily scaled, for example, from 2×2" to 10×14" by providing a larger grounding plate, such as made of aluminum. In a pilot line setting, multiple spray nozzles can be used to cover a larger area. The alignment of spray nozzles is less demanding in powder coat methods compared to wet coat methods since the electrostatic coating generates a relatively soft cloud of powder which is attracted to the glass, rather than a spray having a distinct spray pattern.

Material Simplicity

No binder is necessary for adhesion of the particles to the glass. Thus, a single component mask can be workable. Since the deposited particulates are dry, lengthy development of wet dispersions is avoided. No removal of solvent is required which can save time and processing costs.

Cost and Environmental Considerations

Scale-up costs for powder coating methods tend to be lower than for slot die coating since, for example, additional spray guns can be conveniently added compared to adding costly new dies. Lower acid etchant concentrations can be used, since the disclosed process provides porous particle masks free of binder material, which binders can slow the rate of the etch process. The process avoids VOCs. The process provides high transfer efficiency of mask material and makes mask reclaim possible.

Flexibility of Materials Selection

A variety of hard wax, soft wax, wax having intermediate hardness, or combinations thereof, can be selected and used for particle cores, particle shells, or combination thereof, in the disclosed electrostatic powder coating process. Electrostatic charge keeps the deposited particle on the surface. In contrast, in wet spray methods when hard waxes were used they had a tendency to bounce off the glass substrate.

In embodiments, the at least one surface of the article can be, for example, a glass, a composite, a ceramic, a plastic or resin based material, and like materials, or combinations thereof. In embodiments, the deposited deformable microencapsulated particles can be polymer particles and can additionally or alternately include, for example, any suitable low melting substance: a glass, a composite, a ceramic, a plastic or resin based material, a metal, a salt, a clay, a polymer, a copolymer, glass, or polymeric nano-particles, cross-linked polymer particles, UV cured particles, wax particles, and like materials, or combinations thereof. In embodiments, the etchant can be comprised of at least one acid suitable for etching the surface beneath the deposited particles.

Additionally or alternatively, contacting the at least one surface with microencapsulated particles can be accomplished with a concentrated particle suspension comprising, for example, a carrier liquid, or a particle suspension of intermediate concentration. The particle-surface contacting can preferably be accomplished using any suitable method, for example, slot-die coating, screen printing, knife over roll coating (gap coating), rod coating, spray coating, curtain coating, and like application methods, or a combination thereof. The deposited particles can have, for example, a D50 diameter of from about 0.1 to about 30 micrometers, from about 1 to about 30 micrometers, and from about 1 to about 25 micrometers, including intermediate values and ranges. In embodiments, the particle size range can be, for example, from about 0.1 to about 50 micrometers, 1 to about 30 micrometers, 2 to about 20 micrometers, and like particle diameters, including intermediate values and ranges. In embodiments, the microencapsulated particle size properties can be, for example, monomodal, bimodal, tri-modal, and like modalities, including monodisperse, oligodisperse, polydisperse, and like particle sizes and particle properties, or combinations thereof.

In embodiments, the contacting of the particulated surface with an etchant can be accomplished by, for example, exposing the surface having the deposited microencapsulated particles to the etchant, for example, for from about 1 second to about 30 minutes, including intermediate values and ranges, such as about 10 seconds to about 10 minutes, about 20 seconds to about 1 minute, and like exposures or intervals.

In embodiments, the preparative method can optionally further include, for example, washing the resulting etched textured or anti-glare surface, chemically strengthening the textured or anti-glare surface, applying a functional coating or film (e.g., a light sensitive or polarizing film) or protective surface coating or film, and like coatings or films, or a combination thereof.

In embodiments, when a single-side acid-etch, or like modification is desired on a sheet of glass, one side of the glass can be protected from the etching solution. Protection can be achieved, for example, by applying an insoluble non-porous coating such as an acrylic wax, or a laminate film having an adhesive layer, for example, an acrylic, a silicone, and like adhesives materials, or combinations thereof. Coating application methods can include, for example, brushing, rolling, spraying, laminating, and like methods. The acid-etch exposed insoluble non-porous protective coating survives the etching process and can be readily removed after the etching. Removing the protective film from the surface of the article can be accomplished using any suitable method, such as contacting the protective film with a dissolving liquid, heating the film to liquefy and drain, and like methods and materials, or a combination thereof. Thus, the preparative method can optionally further include, prior to etching, contacting at least another surface, e.g., a second surface such as the backside of a glass sheet, of the article with an optionally removable, etch-resistant protective layer.

In embodiments, the disclosure provides an article prepared by any of the preparative processes disclosed herein, such as a glass article prepared by the above mentioned particle deposition, particle deformation, particle surface adherence, and etching steps. In embodiments, the preparative processes can be accomplished sequentially, simultaneously, continuously, semi-continuously, batch-wise, and like permuations, or combinations thereof.

In embodiments, the method can optionally further include removing any residual particles from the glass surface after the etching step, removing any protective film layers, and can also involve subsequent etching steps that occur after the particles and protective films have been removed from the glass. These subsequent etching steps can further modify the surface roughness profile of the glass or the glass surface chemistry.

In embodiments, the at least one surface of the article can be a glass, the deposited particles can be wax coated or wax encapsulated microencapsulated particles, and the etchant can be at least one acid.

In embodiments, the glass article having anti-glare surface of the disclosure can comprise a distribution of topographic features having an average diameter of about 0.1 to about 100 micrometers, about 0.1 to about 50 micrometers, about 0.1 to about 30 micrometers, and like ranges, including intermediate values and ranges.

In embodiments, the disclosure provides a display system including at least one glass article having a textured surface prepared by the disclosed method of making.

In embodiments, the disclosure provides a wet etch process to form a uniform, nano- to micro-scale textured surface on most silicate glasses and without having a significant impact on chemical strengthening capability of the glass. The process includes depositing or otherwise coating deformable particles, such as microencapsulated particles, on the glass surface, followed by particle deformation or surface adherence, and acid etching of the particulated surface, such as in an HF, or multi-component acid solution. In embodiments, the HF solution can preferentially etch around the adhered or annealed particles on the glass surface, then can optionally, depending upon conditions and duration, subsequently erode the adhered or annealed particles from the etched surface, and can also reduce the surface roughness.

In embodiments, the desired reduced gloss or glare levels can be obtained, for example, by adjusting at least one or more of the following parameters: the level or concentration or amount of the particles deposited, the concentration of the acid etchant, the particle size distribution (PDS) of the particles used, and the exposure interval or the time that the particle-bearing surface of the glass sample is in contact with the acid etchant. When a dry-coating method is used, other process parameters can be adjusted such as the ambient humidity in the coating chamber. In embodiments, the masked surface can be etched, the masking material can subsequently be removed, and the unmasked etched surface can be etched one or more additional times, for example, to provide at least some smoothing of the unmasked etched surface. Dry powder coating and methods of the disclosure provide several advantages over other methods such as wet spray, and wet slot die coating. Such advantages include, for example, coating uniformity, no need for binder or solvent, and coating process is free of volatile organic compounds.

In embodiments, a textured-surface glass article is provided. The textured-surface glass article can be ion-exchangeable and can have at least one roughened surface. The roughened surface has a distinctness-of-reflected image (DOI) of less than 90 when measured at an incidence angle of 20° (DOI at 20°). A pixelated display system that includes the anti-glare glass article is also provided. The glass article can be, for example, a planar sheet or panel having two major surfaces joined on the periphery by at least one edge, although the glass article can be formed into other shapes such as, for example, a three-dimensional shape. At least one of the surfaces is a roughened surface including, for example, topological or morphological features, such as, projections, protrusions, depressions, pits, closed or open cell structures, particles, islands, lands, trenches, fissures, crevices, and like geometries and features, or combinations thereof.

In embodiments, the disclosure provides a method of making an article having a textured surface, comprising:

electrostatically depositing microencapsulated particles, the particles having a softening behavior at a temperature related to $T_g$, on a portion of a glass surface of the article, for example, using either wet or dry coating methods; and heating the article having the deposited microencapsulated particles to soften the shell of the microencapsulated particles to promote attaching behavior, and enhance adhesion of the particles to the glass surface and cohesion of the particle to one another, the heated article can optionally be cooled;

contacting the heated or optionally cooled article having the deposited particles with an etchant to form a surface roughness on the glass;

removing the particles, or any remnants thereof, from the glass surface; and optionally further etching the glass surface after particle removal to create rounded features or otherwise create a targeted surface roughness profile.

In embodiments, the disclosure provides an aluminosilicate glass article. The aluminosilicate glass article can include, for example, at least 2 mol % $Al_2O_3$, can be ion-exchangeable, and can have at least one roughened surface. The aluminosilicate glass article can have at least one roughened surface comprising a plurality of topographical features. The plurality of topographical features can have an average characteristic largest feature size (ALF) of from about 1 micrometer to about 50 micrometers.

In embodiments, the disclosure provides a display system. The display system can include, for example, at least one glass panel and a pixelated image-display panel adjacent to the glass panel. The image-display panel can have a minimum native pixel pitch dimension. The average characteristic largest feature size (ALF) of the glass panel can be less than the minimum native pixel pitch dimension of the display panel. The pixelated image display panel can be, for example, one of an LCD display, an OLED display, or like display devices. The display system can also include touch-sensitive elements or surfaces. The glass can be, for example, any of the aforementioned glasses, such as an aluminosilicate ion-exchanged glass that has at least one roughened surface including a plurality of features having an ALF, and the image-displaying panel has a minimum native pixel pitch. The minimum native pixel pitch can be, for example, greater than the ALF of the roughened surface of the glass panel.

ALF is measured in the plane of (i.e., parallel to) the roughened glass surface, and is therefore independent of roughness. ALF is a measurement of feature variation in the x- and y-directions, i.e., in the plane of the roughened glass surface. Selecting the largest characteristic features is a useful distinction from other methods that determine a more global average feature size. The largest features are most easily seen by the human eye and are therefore most important in determining visual acceptance of the glass article. In embodiments, the topological or morphological features of the at least one roughened surface has an average characteristic largest feature (ALF) size of from about 1 micrometer to about 50 micrometers, of from about 5 micrometers to about 40 micrometers; of from about 10 micrometers to about 30 micrometers; and from about 14 micrometers to about 28 micrometers, including intermediate values and ranges. The average characteristic largest feature size is the average cross-sectional linear dimension of the twenty largest repeating features within a viewing field on a roughened surface. A standard calibrated optical light microscope can typically be used to measure feature size. The viewing field is proportional to the feature size, and typically has an area of approximately 30(ALF)×30(ALF). If, for example, the ALF is approximately 10 micrometers, then the viewing field from which the twenty largest features are selected is approximately 300 micrometers×300 micrometers. Small changes in the size of the viewing field do not significantly affect ALF. The standard deviation of the twenty largest features that are used to determine ALF should generally be less than about 40% of the average value, i.e., major outliers should be ignored since these are not considered "characteristic" features.

The topography of the disclosed textured or anti-glare surface can include, for example, features such as protrusions or projections, depressions, and like features having a maximum roughness (out-of-plane) dimension of less than about 1000 nm. The resulting anti-glare surface can have a peak-to-valley height difference (PV) measure on the surface of less than about 2 microns. In embodiments, the anti-glare surface can have a RMS roughness of less than about 800 nm, of less than about 500 nm, and less than about 150 nm, including intermediate values and ranges.

The features used to calculate ALF are "characteristic;" i.e., at least twenty similar features can be located in the proportional viewing field. Different morphologies or surface structures can be characterized using ALF. For example, one surface structure may appear to be closed-cell repeating structures, another may appear to be small pits separated by large plateaus, and a third may appear to be a field of small particles punctuated by intermittent large smooth regions. In each instance, the ALF is determined by measuring the twenty largest repeating surface regions that are substantially optically smooth. In the instance of the repeating closed cell surface structure, the features to be measured are the largest of the cells in the closed-cell matrix. For the surface structure comprising small pits separated by large plateaus, the large plateaus between pits are to be measured. For the surface comprising a field of small particles punctuated by intermittent large smooth regions, the intermittent large smooth regions are to be measured. Surfaces with substantially varying morphologies can thus be characterized using ALF.

In embodiments, the at least one roughened surface of the glass article has an average RMS roughness can be from about 10 nm to about 800 nm, from about 40 nm to about 500 nm, and from about 40 nm to about 300 nm. In embodiments, the average RMS roughness can be greater than about 10 nm and less than about 10% of the ALF, greater than about 10 nm and less than about 5% of ALF, and greater than about 10 nm and less than about 3% of ALF.

The specification of low DOI and high Ros/Rs provide constraints on the characteristic feature size and ALF. For a given roughness level, larger feature sizes result in lower DOI and higher Ros/Rs. Therefore, to balance the DOI and roughness targets, in embodiments, one can create anti-glare surfaces having an intermediate characteristic feature size that is neither too small nor too large. In display-cover applications, one can minimize reflected or transmitted haze when the transmitted haze is scattering into very high angles that can cause a milky white appearance of a roughened article under ambient lighting.

"Transmission haze," "haze," or like terms refer to the percentage of transmitted light scattered outside an angular cone of ±4.0° according to ASTM D1003. For an optically smooth surface, the transmission haze is generally close to zero. Transmission haze of a glass sheet roughened on two sides (Haze2-side) can be related to the transmission haze of a glass sheet having an equivalent surface that is roughened on only one side (Haze1-side), according to the approximation of eq. (2):

$$Haze_{2\text{-}side} \approx [(1-Haze_{1\text{-}side}) \cdot Haze_{1\text{-}side}] + Haze_{1\text{-}side} \quad (2).$$

Haze values are usually reported in terms of percent haze. The value of Haze2-side from eq. (2) must be multiplied by 100. In embodiments, the disclosed glass article can have a transmission haze of less than about 50% and even less than about 30%.

A multistep surface treatment process has been used to form the roughened glass surface. An example of a multistep etch process is disclosed in commonly owned co-pending U.S. patent application Ser. No. 12/730,502, filed Mar. 24, 2010, to Carlson, et al., entitled "Glass Having Anti-Glare Surface and Method of Making," where a glass surface is treated with a first etchant to form crystals on the surface, then etching a region of the surface adjacent to each of the crystals to a desired roughness, followed by removing the crystals from the glass surface, and reducing the roughness of the surface of the glass article to provide the surface with a desired haze and gloss.

In embodiments, various performance enhancing additives can be included in the dry or liquid micro encapsulated particle formulation, the etch solution, or both, including for example, a surfactant, a co-solvent, a diluent, a lubricant, a gelation agent, a charge control agent, and like additives, or combinations thereof. In embodiments, the surfactant can preferably be a perfluorinated surfactant, such a Tomamin® surfactant.

The contacting the particulated surface with an etchant can involve, for example, selective partial or complete dipping, spaying, immersion, and like treatments, or a combination of treatments, with an acidic etch solution including, for example, 2 to 10 wt % hydrofluoric acid and 2 to 30 wt % of a mineral acid, such as hydrochloric acid, sulfuric acid, nitric acid, phosphoric acid, and like acids, or combinations thereof. The glass surface can be etched in the solution for periods of from about 1 second to about 10 minutes, including intermediate values and ranges. The disclosed concentrations and etch times are representative of suitable examples. Concentrations and etch times outside the disclosed ranges can also be used to obtain the roughened surface of the glass article albeit potentially less efficiently. Other etch concentrations can be, for example, 3M HF/3.6 M $H_2SO_4$, 5.5M HF/6.5M $H_2SO_4$, 6M HF/7 M $H_2SO_4$, and like etch compositions and concentrations, including intermediate values and ranges, and compositions.

In chemical strengthening, larger alkali metal ions are exchanged for smaller mobile alkali ions near the glass surface. This ion-exchange process places the surface of the glass in compression, allowing it to be more resistant to any mechanical damage. In embodiments, the outer surface of the glass article can optionally be ion-exchanged where smaller metal ions are replaced or exchanged by larger metal ions having the same valence as the smaller ions. For example, sodium ions in the glass can be replaced with larger potassium ions by immersing the glass in a molten salt bath containing potassium ions. The replacement of smaller ions with larger ions creates a compressive stress within the layer. Alternately, in embodiments, the larger ions near the outer surface of the glass can be replaced by smaller ions, for example, by heating the glass to a temperature above the strain point of the glass. Upon cooling to a temperature below the strain point, a compressive stress is created in an outer layer of the glass. Chemical strengthening of the glass can optionally be performed after the surface roughening treatment, with little negative effect on the ion-exchange behavior or the strength of the glass article.

In embodiments, the disclosure provides a method for making an anti-glare surface including, for example, "particulating" (i.e., populating) the surface with particles, such as with a liquid-free particle dispersion or a soot gun, optionally deforming or adhering the particulates to the surface, etching the adhered particulated surface with a suitable etchant, optionally ion-exchanging the etched surface, and optionally accomplishing further processing to reduce objectionable surface flaws (i.e., flaw reduction). Alternatively or additionally, the surface can be ion-exchanged, particulated with particles, particles adhered to the surface, etched with an etchant, and optionally further acid polished to reduce the effect of surface flaws.

Referring to the figures, FIG. 1 shows a schematic of an exemplary microencapsulated bead or particle having a wax shell (110) and higher melting core (120) on as glass substrate (100) before thermalizing (left). After thermalizing (right) there results, for example, a solidified wax puddle (130), partially or completely deshelled core particles (140), and optionally a solidified wax bridge (150) structure between adjacent core particles. Thermalizing ($\Delta$ or hv), that is, shell melting and redistribution, can be accomplished by any suitable means such as by heating, photonically, or both. The thin shell ensures limited "spot" attachment of the particle core to the substrate and provides little or no large wax or polymer pools when thermalized. The melt temperature and viscosity relation of the selected particles in not particularly significant because the shell melt viscosity can be selected independent of the core particle melt viscosity.

Figure 2A:
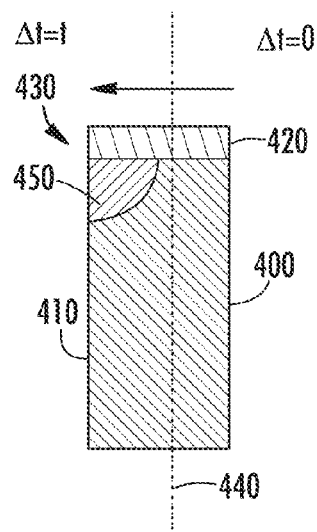
FIGS. 2A to 2C shows modeling results of etch texture using a resistant mask (2B) and nonresistant mask (2C).
Figure 2B:
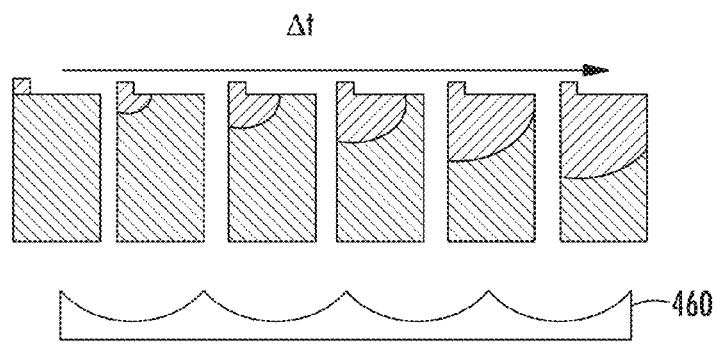
Figure 2C:
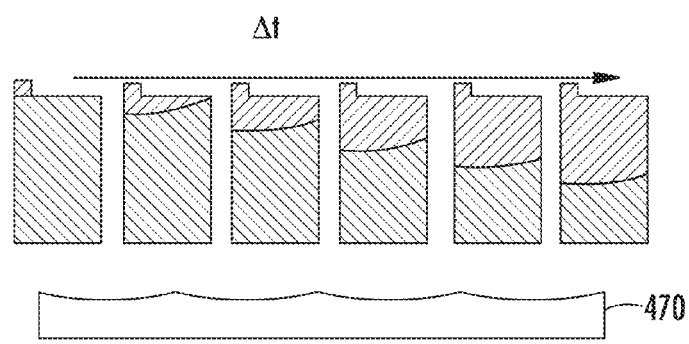

FIGS. 2A to 2C show model results of mask-etch phenomena and resulting glass substrate texture. The modeling results demonstrate the importance of controlling the degree or extent of mask adhesion and acid resistance with respect to controlling the glass surface profile after etching. FIG. 2A shows a portion of a masked sample before etching (right side of dashed line (440); $\Delta t=0$) and during or after etching (left side of dashed line (440); $\Delta t=t$) where $\Delta t$ represents time's arrow. The glass substrate before etch (400) is covered with a mask layer (420). Contacting the masked substrate with acid (430) provides an advancing etch front (450) that produces residual or remaining etched glass (410). FIG. 2B shows mask-etch modeling of a mask having a highly acid resistant bond or adhesive property that produces the resulting glass surface contour structure (460) having more pronounced features compared to the results in FIG. 2C. FIG. 2C shows mask-etch modeling of a mask having a weakly acid resistant bond or adhesive property that produces the resulting glass surface contour structure (470) having less pronounced features compared to the results in FIG. 2B. For "weaker" masks the acid etches the glass and disintegrates the bond between the mask and the glass. This tends to promote acid penetration to a greater extent laterally resulting in a relatively smoother etched glass surface. For textures where low sparkle is not a requirement and high haze is desired, particles having high adhesion and high acid resistance (i.e., non-microencapsulated) may be preferred alternatives.

Prior to electrostatically depositing particles, the glass substrate can optionally be prepared to receive the particles by, for example, a surface treatment or electrostatic charging. The electrostatic deposition of the particles onto a glass surface can be accomplished directly and without suspending the particles in a liquid. The particles themselves may be treated, for example, to have like charges to each other so that the particles repel one another, for example, to create a fine, free-flowing particle dispersion, but having an opposite charge to the glass surface (or for example having a charged plate behind the glass sheet) so that the particles are attracted to the glass surface. The optional thermal treatment of the particulated glass surface can be accomplished, for example, for a short time, such as about 30 seconds and at a relatively low temperature (e.g., 115° C.) to fuse particles together and adhere the particles to the glass surface, but to avoid formation of a continuous film. Etching the thermally treated particulated glass surface can be accomplished with a suitable etchant, such as $HF/H_2SO_4$ solution, to produce an anti-glare surface.

In embodiments of the disclosure particles are directly deposited onto a glass substrate or surface to provide one or more layers of particles on the glass surface. The sample can then be etched by dipping, for example, into the $HF/H_2SO_4$ bath. The acid attacks the area around the particles and eventually undercut the area of the particles. In embodiments of the disclosed method of making, there is preferably no solvent, no binders, no rheology modifiers, or no dispersant involved. The particles do not need to be suspended in a solution. This can provide significant cost savings and significant reductions in the level of process complexity.

The disclosed etch method can be accomplished quickly, for example, in from about 1 second to about 10 minutes, from about 1 second to about 5 minutes, including intermediate values and ranges, such as in from about 2 second to about 4 minutes, to create an anti-glare layer on a glass surface. A conventional multi-bath method can take about 60 minutes or more. The disclosed etch method can use a single chemical etchant bath (e.g., HF and $H_2SO_4$) instead of three or more baths used in conventional processes.

In embodiments, the disclosed method can etch away, for example, from about 1 to about 50 micrometers of the substrate being etched (i.e., into the plane of the substrate or the z-direction), from about 1 to about 30 micrometers of the substrate, from about 1 to about 20 micrometers of the substrate, from about 1 to about 10 micrometers of the substrate, including intermediate values and ranges, to create a desired anti-glare layer. In contrast, a conventional etch process can typically remove about 100 to about 200 micrometers of the glass surface.

Samples prepared with the disclosed process show similar optical properties (e.g., haze, gloss, and distinctness of image (DOI)) when compared with samples etched with a conventional process, but the present method and samples are advantaged by having substantial reductions in process time and costs. The disclosed process is readily scaled-up for large parts, such as a one square meter glass sheet, and above, while a conventional dip process is less readily scalable for larger units.

Some significant benefits or advantages of the disclosed process compared to the other processes are mentioned below.

Haze can be adjustable from very low to very high values. Low haze is desirable for applications requiring high display contrast, while high haze is useful for optical designs requiring scattering (such as edge illumination) or for aesthetic reasons such as reducing the "black hole" appearance of the display in the off state. The preference for low vs. high haze (and the acceptance of performance trade-offs) are typically driven by customer or end-user preferences, and the final application and use mode.

Roughness can be adjusted, for example, from very low to very high values. Low roughness is generally used to create small-angle scattering, resulting in low DOI with low haze and corresponding high display contrast. However, high roughness is desirable for some applications, such as in some touch-display devices where a rough surface provides a "gliding feel" for a user's finger. This effect of high roughness is also useful in non-display applications, such as mouse pad surfaces. For these touch applications, it is also desirable to post-treat the rough surface with a low-surface energy coating such as a fluorosilane, as we have demonstrated in separate experiments for various anti-glare (AG) types surfaces. The low-surface energy coating reduces surface friction, improves the "gliding feel" effect, and also makes the surfaces less wettable by oil and water, and easier to clean.

The widely adjusted haze and roughness values were achieved using short etch times (e.g., 30 seconds) and very little glass thickness loss (e.g., less than 5 microns) relative to our aforementioned earlier anti-glare processes.

The disclosed process notably uses a considerably lower acid concentration or shorter etch times to achieve high haze and roughness values compared to the abovementioned process in commonly owned and assigned U.S. Ser. No. 13/090, 561.

The ability to adjust haze, DOI, or roughness through particle annealing temperature provides additional flexibility to use the same acid for multiple haze levels, or alternately, to reduce the acid concentration used to achieve a given haze level. This control of surface profile through particle annealing before etch is independent of the coating method (wet or dry).

The dry or electrostatic deposition method used to apply particles to the glass surface permits excess or unnecessary particles to be readily removed, for example, with blowing air, vacuum, and like methods, leaving a very thin layer, such as only 1 to 2 layers, or in some instances less than a monolayer, of particles on the surface.

In the aforementioned process in commonly owned and assigned U.S. Ser. No. 13/090,561, to create an anti-glare layer, particles are suspended in a liquid, then sprayed or otherwise applied onto the glass surface. Particle deposition from suspension is followed by etching. The particle mixing/suspension process can be a complicated operation, since it can include a solvent (e.g., with VOC), a rheology modifier, a dispersant, a binder, and like ingredients. The disclosed process does not require any of these ingredients or like ingredients, nor mixing steps, and can eliminate all the VOC, and other additives. These simplifications reduce process complexity and cost.

With a proper design selection, the disclosed process does not need backside protection to make single-sided samples. Single-sided samples can be prepared using for example, single-side dip, spray, screen printing, or spin coating methods. A multi-bath conventional process needs backside protection film, which can further increase manufacturing costs.

In embodiments, the glass article can comprise, consist essentially of, or consist of one of a soda lime silicate glass, an alkaline earth aluminosilicate glass, an alkali aluminosilicate glass, an alkali borosilicate glass, and combinations thereof. In embodiments, the glass article can be, for example, an alkali aluminosilicate glass having the composition: 60-72 mol % $SiO_2$; 9-16 mol % $Al_2O_3$; 5-12 mol % $B_2O_3$; 8-16 mol % $Na_2O$; and 0-4 mol % $K_2O$, wherein the ratio $$\frac{Al_2O_3(\text{mol \%}) + B_2O_3(\text{mol \%})}{\sum \text{alkali metal modifiers (mol \%)}} > 1,$$

where the alkali metal modifiers are alkali metal oxides. In embodiments, the alkali aluminosilicate glass substrate can be, for example: 61-75 mol % $SiO_2$; 7-15 mol % $Al_2O_3$; 0-12 mol % $B_2O_3$; 9-21 mol % $Na_2O$; 0-4 mol % $K_2O$; 0-7 mol % MgO; and 0-3 mol % CaO. In embodiments, the alkali aluminosilicate glass substrate can be, for example: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-8 mol % MgO; 0-10 mol % CaO; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol %$\leq Li_2O+Na_2O+K_2O\leq$20 mol % and 0 mol %$\leq$MgO+CaO$\leq$10 mol %. In embodiments, the alkali aluminosilicate glass substrate can be, for example: 64-68 mol % $SiO_2$; 12-16 mol % $Na_2O$; 8-12 mol % $Al_2O_3$; 0-3 mol % $B_2O_3$; 2-5 mol % $K_2O$; 4-6 mol % MgO; and 0-5 mol % CaO, wherein: 66 mol %$\leq SiO_2+B_2O_3+CaO\leq$69 mol %; $Na_2O+K_2O+B_2O_3+MgO+CaO+SrO$>10 mol %; 5 mol %$\leq$MgO+CaO+SrO$\leq$8 mol %; $(Na_2O+B_2O_3)-Al_2O_3\leq$2 mol %; 2 mol %$\leq Na_2O-Al_2O_3\leq$6 mol %; and 4 mol %$\leq$$(Na_2O+K_2O)-Al_2O_3\leq$10 mol %. In embodiments, the alkali aluminosilicate glass can be, for example: 50-80 wt % $SiO_2$; 2-20 wt % $Al_2O_3$; 0-15 wt % $B_2O_3$; 1-20 wt % $Na_2O$; 0-10 wt % $Li_2O$; 0-10 wt % $K_2O$; and 0-5 wt % (MgO+CaO+SrO+BaO); 0-3 wt % (SrO+BaO); and 0-5 wt % ($ZrO_2$+$TiO_2$), wherein $0\leq(Li_2O+K_2O)/Na_2O\leq$3.5.

In embodiments, the alkali aluminosilicate glass can be, for example, substantially free of lithium. In embodiments, the alkali aluminosilicate glass can be, for example, substantially free of at least one of arsenic, antimony, barium, or combinations thereof. In embodiments, the glass can optionally be batched with 0 to 2 mol % of at least one fining agent, such as $Na_2SO_4$, NaCl, NaF, NaBr, $K_2SO_4$, KCl, KF, KBr, $SnO_2$, and like substances, or combinations thereof.

In embodiments, the selected glass can be, for example, down drawable, i.e., formable by methods such as slot draw or fusion draw. In these instances, the glass can have a liquidus viscosity of at least 130 kpoise. Examples of alkali aluminosilicate glasses are described in commonly owned and assigned U.S. patent application Ser. No. 11/888,213, to Ellison, et al., entitled "Down-Drawable, Chemically Strengthened Glass for Cover Plate," which claims priority from U.S. Provisional Application 60/930,808, now U.S. Pat. No. 7,666, 511, issued Feb. 23, 2010; U.S. patent application Ser. No. 12/277,573, to Dejneka, et al., entitled "Glasses Having Improved Toughness and Scratch Resistance," which claims priority from U.S. Provisional Application 61/004,677; U.S. patent application Ser. No. 12/392,577, to Dejneka, et al., entitled "Fining Agents for Silicate Glasses", which claims priority from U.S. Provisional Application No. 61/067,130, now U.S. Pat. No. 8,158,563, issued Apr. 17, 2012; U.S. patent application Ser. No. 12/393,241, to Dejneka, et al., entitled "Ion-Exchanged, Fast Cooled Glasses," which claims priority to U.S. Provisional Application No. 61/067,732, now U.S. Pat. No. 8,232,218, issued Jul. 31, 2012; U.S. patent application Ser. No. 12/537,393, to Barefoot, et al., entitled "Strengthened Glass Articles and Methods of Making," which claims priority to U.S. Provisional Application No. 61/087,324, now U.S. Pat. No. 8,075,999, issued Dec. 13, 2011; U.S. patent application Ser. No. 12/858,490, to Barefoot, et al., entitled "Crack and Scratch Resistant Glass and Enclosures Made Therefrom," filed Aug. 18, 2010; and U.S. patent application Ser. No. 12/856,840, to Dejneka, et al., entitled "Zircon Compatible Glasses for Down Draw," filed Aug. 16, 2010.

The glass surfaces and sheets described in the following example(s) can be any suitable particle-coatable and etchable glass substrate or like substrates, and can include, for example, a glass composition 1 through 11, or a combination thereof, listed in Table 1.

Modified Powder Electrostatic Coating

The disclosure provides methods and materials for masking and etching glass surfaces. The masked glass surfaces when etched with hydrofluoric acid provide glass surfaces, for example, for display applications, having reduced glare properties resulting from the formation of a micro-textured surface on glass. The disclosed method includes electrostatically spraying particulates onto glass (also known as powder coating), or application of powder by electro-magnetic brush (EMB) technology. Subsequent process steps include: adhering the particulates to glass, by for example heating the coated glass article; partially fusing the particulates to one another (but not forming a continuous film); and etching the glass to differentially etch the surface.

tion selected should be resistant to degradation by, for example, hydrofluoric acid and mixtures of hydrofluoric with other like acid etchants, such as sulfuric acid. The particle composition selected should be heat deformable to enable adhesion of the particles to the glass surface. Particle deformation preferably occurs in a temperature range below the strain point of glass. The particle composition selected can include, for example, particles comprised of: waxes including, for example, low molecular weight polyethylenes, thermoplastic resins, thermosetting resins, and like materials, or combinations thereof. Commercially available powder coating compositions can be selected, for example, if they do not contain additives which might function as flow agents that might tend to reduce porosity of annealed or melted coatings. In embodiments, the particles selected can be modified to improve flowability properties during spraying, and for modifying the adhesion of particles to glass surface. Modification of the amount or type of flow/adhesion agent on particles can be used to adjust the optical properties of the resulting etched glass.

Application Process

Electrostatic spray or powder spray can be accomplished using commercial equipment, and conducted, for example, in a spray booth. The glass surface should be grounded, or alternatively be oppositely charged, for example, with a metal plate behind glass. This aspect can be significant for attracting charged particle to glass. The plate can be specially made to conform to size and shape of glass. The combination of the plate and glass can eliminate air gaps between glass and metal ground which may reduce particle attraction. The metal plate and glass surface can have flat, curved, intermediate geometries, and like geometries, or combination thereof. In embodiments, the grounding plate can be provided preheated, such as with a heating means to eliminate the need for an intermediate heating between coating and etching steps.

TABLE 1

Representative glass substrate compositions.

| Glass > Oxides (mol %) | 1 | 2 | 3 | 4 | 5 | 6 | 7 | 8 | 9 | 10 | 11 |
|---|---|---|---|---|---|---|---|---|---|---|---|
| $SiO_2$ | 66.16 | 69.49 | 63.06 | 64.89 | 63.28 | 67.64 | 66.58 | 64.49 | 66.53 | 67.19 | 70.62 |
| $Al_2O_3$ | 10.29 | 8.45 | 8.45 | 5.79 | 7.93 | 10.63 | 11.03 | 8.72 | 8.68 | 3.29 | 0.86 |
| $TiO_2$ | 0 | | | — | — | 0.64 | 0.66 | 0.056 | 0.004 | — | 0.089 |
| $Na_2O$ | 14 | 14.01 | 15.39 | 11.48 | 15.51 | 12.29 | 13.28 | 15.63 | 10.76 | 13.84 | 13.22 |
| $K_2O$ | 2.45 | 1.16 | 3.44 | 4.09 | 3.46 | 2.66 | 2.5 | 3.32 | 0.007 | 1.21 | 0.013 |
| $B_2O_3$ | 0.6 | | 1.93 | — | 1.9 | — | — | 0.82 | — | 2.57 | — |
| $SnO_2$ | 0.21 | 0.185 | — | — | 0.127 | — | — | 0.028 | — | — | — |
| BaO | 0 | — | — | — | — | — | — | 0.021 | 0.01 | 0.009 | — |
| $As_2O_3$ | 0 | — | — | — | — | 0.24 | 0.27 | | — | 0.02 | — |
| $Sb_2O_3$ | — | — | 0.07 | — | 0.015 | — | 0.038 | 0.127 | 0.08 | 0.04 | 0.013 |
| CaO | 0.58 | 0.507 | 2.41 | 0.29 | 2.48 | 0.094 | 0.07 | 2.31 | 0.05 | 7.05 | 7.74 |
| MgO | 5.7 | 6.2 | 3.2 | 11.01 | 3.2 | 5.8 | 5.56 | 2.63 | 0.014 | 4.73 | 7.43 |
| $ZrO_2$ | 0.0105 | 0.01 | 2.05 | 2.4 | 2.09 | — | — | 1.82 | 2.54 | 0.03 | 0.014 |
| $Li_2O$ | 0 | — | — | — | — | — | — | — | 11.32 | — | — |
| $Fe_2O_3$ | 0.0081 | 0.008 | 0.0083 | 0.008 | 0.0083 | 0.0099 | 0.0082 | 0.0062 | 0.0035 | 0.0042 | 0.0048 |
| SrO | — | — | — | 0.029 | — | — | — | — | — | — | — |

Mask Material

Particulate materials can have an average diameter of, for example, less than 20 micrometers, and preferably from 5 to 15 micrometers. Any particle shape can be useful. However, spherical particles can be preferred, for example, in spray applications because of superior flowability. Particulate materials can be a mixtures of particles having different average diameters or melt temperatures for use in adjusting or obtaining specific optical properties. The particle composi- The air gaps can be designed or manipulated to provide patterns in particle coating and in the resulting etched glass article.

Melting Particles

In embodiments, softening or melting of the low melt particles can be performed in a variety of ways including, for example, convection, infrared, conduction, and like methods, or combinations thereof. The particle coated glass article can be oriented in any direction since particles can be adhered to the glass by static charge. Electrostatic spray particle deposition can be particularly useful since statically charged particles can provide certain benefits and advantages in the disclosed method.

Mask Material and Adhesion

In embodiments, the acid etch mask can be comprised of microencapsulated particulates having a core and shell. The core and shell have different properties to facilitate desired mask formation, to control acid etching behavior of the mask, and to achieve desired glass surface properties. The shell has a lower melting temperature and lower acid resistance compared to the core material.

The microencapsulated particulate mask provides for differential acid etch. Adjustable properties of the shell material can be used to determine and control the particle mask footprint and the acid resistance characteristic of the mask that can be used to obtain specific etched glass properties.

The adjustable properties of the shell material include, for example, melt temperature, melt viscosity, acid resistance, and triboelectric chargeability. Exemplary shell materials can be, for example, a low melting polymer or wax. The shell material can further include a filler or like material for modifying the melt rheology shell material (see e.g., Yang, et al., Dry particle coating for improving the flowability of cohesive powders, in *Powder Technology*, 158 (2005) 21-33), or powder flowability properties of the core-shell particles. Modifying the flow and charging properties of particle powders using flow aids, such as hydrophobically modified nanoparticulate silicas (e.g., Aerosil® R972 from DeGussa) and like materials, is known (see for example, U.S. Pat. No. 7,749,670). Surface additives that can be added to the surface of the particle powder compositions include, for example, metal salts, metal salts of fatty acids, colloidal silicas, metal oxides, and like materials, and mixtures thereof, which additives can be present in an amount of, for example, from about 0.1 to about 2 weight percent. Examples of suitable additives include zinc stearate and Aerosil R972® in amounts of from about 0.1 to about 2 percent which can be added during the core-shell creation or combination, or blended onto the surface of the core-shell particles. The particle powder compositions can also include known charge additives in effective amounts such as, from about 0.1 to about 5 weight percent, such as alkyl pyridinium halides, bisulfates, and like known materials.

In embodiments, the shell material can be, for example, a polyethylene wax and can be present on the surface of the core in an amount of about 1 to about 25 weight percent, from about 2 to about 20 weight percent and from about 3 to about 15 weight percent, including intermediate values and ranges, based on the weight of the core particle material. The core-shell particles can optionally have a filler material or surface modifying material such as a flow aid, such as fumed silica or like materials, in an amount of, for example, from about 0.1 to about 15 weight percentage based on the weight of the core-shell particle material.

The shell material can be present on the core particle in any of various thicknesses that can provide suitable adherence of the transformed particles onto the glass substrate. A suitable thickness of the shell material on the core can be, for example, from about 0.01 to about 25 microns, from 0.05 to 25 microns, from 0.05 to 20 microns, from 0.1 to 20 microns, from 0.1 to 15 microns, from 0.1 to 10 microns, from 0.1 to 1 microns, and from 0.1 to 0.5 microns including intermediate values and ranges. The selected shell material thickness enables a selected footprint of the melted shell (i.e., the shell's resultant puddle pattern) and the extent of adhesion of the particle mask to glass surface. In embodiments, the shell thickness can be, for example, from about 0.05 microns to about 0.5 microns, including intermediate values and ranges. A shell comprised of a polymer, such as 6 wt % polyethylene, can have a nominal thickness of about 0.11 microns, and a shell comprised of a polymer, such as 12 wt % polyethylene, can have a nominal thickness of about 0.22 microns.

A microencapsulated particulate mask can be particularly useful when a limited particle footprint is desired. A smaller shell mass on the same or larger core provides a smaller footprint when the shell is melted.

The disclosed microencapsulated particulate mask composition and method also provides operational advantages, such as convenient manufacture, since the shell coating need only be heated to the melt temperature viscosity instead of controlling the heating of the core particle to a temperature below the melt viscosity.

Figure 3B:
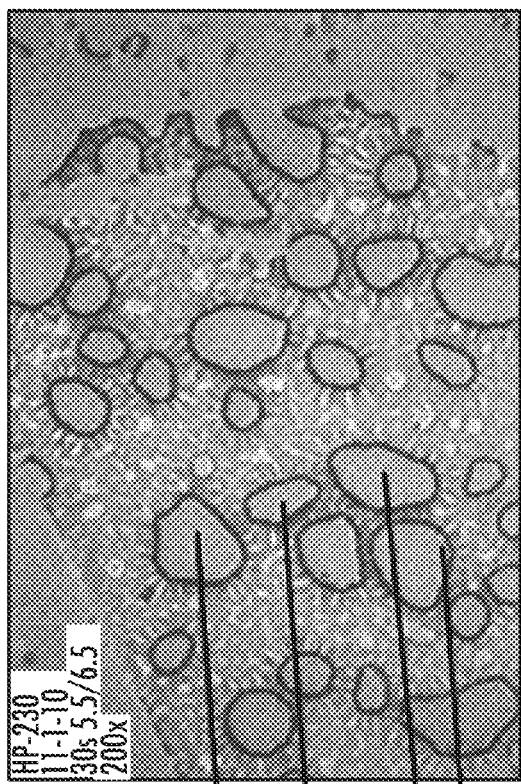
FIGS. 3A and 3B shows optical micrographs of an identical area of glass before (FIG. 3A) and after etch (FIG. 3B), at 200× magnification.
Figure 3A:
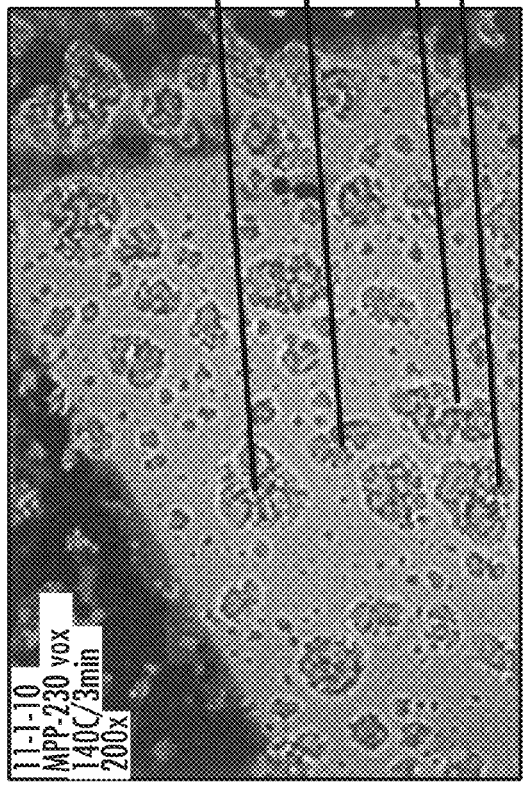

FIGS. 3A and 3B shows optical micrographs (at 200× magnification) of an identical area of glass before etching (FIG. 3A) that shows attached particles, and after etching (FIG. 3B) that shows a differentially etched surface. The superimposed black lines map the initial location of attached particle before etching to the location of protected or relatively un-etched island areas that were initially covered by the particles prior to etching.

The mask is preferably prepared with a material which resists acid attack and is adherent to the glass surface to some extent. If the material either degrades too quickly, or peels off immediately upon acid exposure, then no differential etch will result. In contrast, if the mask and mask-glass interface are impervious given a set of acid conditions, then the resulting features will have steep walls due to undercutting or under-etching (720), as shown in FIG. 4B. An acid resistant mask material leads to high fidelity of mask features, but can also have high haze. Shallow mounds and pits with no flat surfaces on a glass surface can result from a mask which undergoes gradual and complete peeling during etching. However, if the glass is quenched prior to complete peel, the tops of mounds can be flat. Mask peeling (710), can however present a difficult control issue in manufacturing, particularly when shear and gravitational forces are active, such as during immersion or spray etching. In embodiments, certain glass surface texturing applications preferably have a degree of mask peeling as shown in FIG. 4A. This enables shallower surface depressions to be achieved compared with under-etching or under-cutting.

Many mask types that have been evaluated undergo peeling. Generally, these mask materials incorporate a particulate material, such as PMMA beads, and a less acid resistant binder. In such a "bead-and-binder" mask composition the binder (e.g., a cellulose derivative) provides bead-to-glass adhesion and bead-to-bead cohesion. Bead and binder masks typically can have poor reproducibility for lack of control over peeling during etching in, for example, $HF/H_2SO_4$ acids.

Wax materials have also been explored as mask materials. In embodiments, "waxes" in the present disclosure can refer to any hydrocarbon-based organic materials including polymers having a glass transition temperature below 200° C. Wax particle masks, when melted, can provide superior adhesion to the glass and are more acid resistant compared to bead-and-binder masks. The higher acid durability and adhesion of wax masks can lead to higher haze presumably attributable to having a greater depth of undercutting.

Alternatively, rosin can be used as a shell material, which is advantaged by being alcohol soluble.

Target optical properties are listed in Table 2. Distinctness of image (DOI) is a measure of specular reflection and in embodiments is less than 50%. Haze, in embodiments, is less than 10% and can enable good contrast. However, haze values of up to 25% may be desired for other applications. Pixel power deviation (PPD) refers to an optical property, similar to sparkle, and viewing is best when sparkle is less than 7%, as measured by a pixel power deviation device. The pixel power deviation device and method of measuring are disclosed in commonly owned and assigned copending patent application Ser. No. 13/354,827.

TABLE 2

Target optical properties for AG surfaces

| Property | Specification |
|---|---|
| DOI | <50% |
| Haze | <10% for most, up to 25% for some applications |
| PPD | <7% |

To obtain desired properties, the materials for masking must be carefully selected having specific acid resistance and glass adhesion properties to obtain acceptable optical properties for pre-strengthened (e.g., ion-exchanged) glass having anti-glare properties. The ability to controllably adjust optical properties, especially haze, of the treated glass surface is also highly desirable.

Powder coating using electrostatics and challenges of thinner coatings powder coating using electrostatic spray of dry powders is a common industrial process for painting metal parts such as lawn furniture and auto parts. Typical powders or resins used can have a 30 to 35 microns average diameter. The powder coating industry is moving toward thinner coatings having finer surface texture. Thinner coatings require finer particle sizes. Fine (e.g., 20-30 microns) and ultrafine (e.g., less than 20 microns) powders are not compatible with powder coating due to strong interparticle forces (van der Walls) which result in agglomeration and caking in fluidization beds and pneumatic lines used to transport the powders.

Two patents mention the modification of ultrafine powders for improved fluidizability (U.S. Pat. No. 5,635,548 and U.S. Pat. No. 6,833,185). Both patents mention dry blending of powders with inorganic powders for lubrication improves fluidization. In the present disclosure when inorganic powders were applied to the microencapsulated powders of interest, the deposition, the fixing, and the etching steps using the modified particle masks were very effective.

EXAMPLES

The following examples serve to more fully describe the manner of using the above-described disclosure, and to further set forth the best modes contemplated for carrying out various aspects of the disclosure. It is understood that these examples do not limit the scope of this disclosure, but rather are presented for illustrative purposes. The working examples further describe how to prepare the articles of the disclosure.

Example 1

General Procedure for Preparing Particle Masks

The procedure used for particle deposition was the same for all experiments. Specifically, the selected microencapsulated powder or comparative powders was loaded in the hopper of an electrostatic gun (RedLine EZ100) and the glass specimen was manually sprayed having the air pressure at 30 psi and voltage at 100 kV. Corning, Inc., Code 2318 glass parts with 0.7 mm thickness and of sizes 2×2" 4×4", 6×6", and 10×14" were taped to a grounded aluminum plate inside a back drafted spray booth during coating. The handheld corona electrostatic gun creates a powder cloud and directs the cloud towards the grounded glass article. Individual particle spheres are charged at the nozzle and attract to the grounded glass article. After spraying, the coated glass article samples were heated in one of two ways: 1) in a convection oven by placing the coated samples on a preheated aluminum plate for 1 minute at the various melt temperatures, or by passing through a conveyorized Economax D textile dryer (M&R Sales and Service, Inc.) for about 30 second exposure to infrared radiation. Powders which could be melted at temperatures below 200° C. were infrared heated, and the maximum temperatures were measured using surface thermocouples for both heating methods. Maximum heating temperatures ranged from 80 to 260° C. Next, samples were etched in mixtures of hydrofluoric and sulfuric acid by vertical immersion, rinsed, and then dried. Acid mixtures were recorded as ratios of "moles HF/moles $H_2SO_4$", and were always in water as solvent, and etched at room temperature, at about 22° C. All samples were etched in solutions of 5M HF/6M $H_2SO_4$. Microencapsulated powder coated samples were etched in acid which contained 0.3% Tomamine fluorosurfactant (Air Products) to improve wetting.

Optical properties of the etched and dried samples can be measured by any suitable method. Disclosed samples were measured by the following methods, including: percent distinctness of image (DOI) at 20 degrees (Elcometer 6015, Elcometer Ltd.); percent haze in transmission (Haze-gard, BYK Gardener); and percent pixel power deviation (PPD) as disclosed in the abovementioned copending patent application Ser. No. 13/354,827. The copending application discloses an apparatus and method for determining and quantifying "sparkle," i.e., the random noise that is generated when a pixelated image is viewed through a roughened surface of a transparent sample. The apparatus includes a pixelated source and an imaging system located in an optical path originating from the pixelated source, where a transparent sample may be placed in the optical path between the pixelated source and the optical system. The degree of sparkle is determined by: obtaining an integrated image for the pixelated image; and calculating a standard deviation of the integrated pixel power. An objective level of sparkle can be defined by correlating the amount of sparkle provided by the apparatus with visual impressions.

The Table 3 below lists the powders that were electrostatically sprayed. Non-encapsulated powders were obtained from Micropowders, Inc., and encapsulated powders were provided by the University of Western Ontario (UWO). The shell materials are common to the powder coating industry (i.e., polyester and polyester epoxy hybrid). A polyester epoxy hybrid is a polymer having both ester and epoxy functionalities. These shell materials were applied to polymethylmethacrylate (PMMA) core particles which had an average diameter (D50) of 8 microns (EXM 8, from Sekesui). The shell material were applied at 6 and 12 wt percent relative to the weight of the core. A silica flow agent was applied to the surface of the microencapsulated powders at less than 1% of the microencapsulated powder weight.

Results

The disclosed surface modified powders could be sprayed without being agitated (e.g., shaken), and formed un-agglomerated coatings. Hand sprayed powder coatings on glass were uniform by visual inspection. This demonstrated a process simplicity advantage for electrostatic spray samples compared to wet spray where automation, a high level of operator expertise, or both, may be necessary to obtain uniformity. The deposition of powder was controlled by making a number of passes across the substrate using a handheld spray gun, and the deposition rate decreased dramatically when coatings reached about 40 to 55 microns in thickness, indicating a self-limiting film thickness having decreased electrostatic charge as the deposited coating became thicker.

Particle size and thermal properties are meaningful in obtaining the target optical properties.

FIGS. 5A and 5B show, respectively, the effect of heating temperature on texture and three optical properties of glass (DOI, haze and PPD) after powder coating comparative solid wax particles (i.e., non-microencapsulated), heating, and etching. FIG. 5A shows very little change in texture properties with heating and etching for the solid polyethylene powder MPP-645F. This is due to the formation of a continuous acid resistant coating during heating. Data in FIG. 5B show rapid changes in optical properties with changes in temperature by surface textures obtained from etching the solid polyethylene powder MPP-615VF from 100-130° C. Above 130° C. no texture was apparent due to closure of pores in the coating. In addition, the rapid change in optical properties between 100-130° C. (the thermal operating window for creating texture by etch), would make manufacturing glass with specific optical properties difficult. MPP-645F is a micronized synthetic wax consisting of polyethylene particles having a mean particle size of 8 to 10 microns and melting point between 123 and 125° C., available from Micro Powders, Inc. MPP-615VF is a micronized synthetic wax consisting of polyethylene particles having a mean particle size of 5 to 7 microns and melting point between 114 and 116° C., available from Micro Powders, Inc.

Example 2

Solid Wax Particles Having Silica Flow Agent Surface Treatment

FIGS. 6A and 6B demonstrate that a surface applied silica flow agent, such as Aerosil, above a certain loading can positively modify adhesion of wax particles to glass. In comparative wax particle formulations (MP22C, 6A; and MPP615F, 6B), the addition of 2 wt % (solid lines) silica flow agent applied to the surface of the wax particles provided reduced differential etching (as seen by decreased DOI) compared to silica at 1 wt % (dashed lines) where higher differential etching was observed. MP22C is a micronized fully saturated synthetic hydrocarbon wax consisting of polyethylene particles having a mean particle size of 7 to 10 microns and melting point between 101 and 106° C., available from Floridienne, Brussels, Belgium. MPP-615F is a micronized synthetic wax consisting of polyethylene particles having a mean particle size of 7 to 9 microns and melting point between 114 and 116° C., available from Micro Powders, Inc. The silica flow aid can be applied by conventional means such as ball milling, cone milling, or like methods.

Example 3

Microencapsulated Particles

Figure 7A:
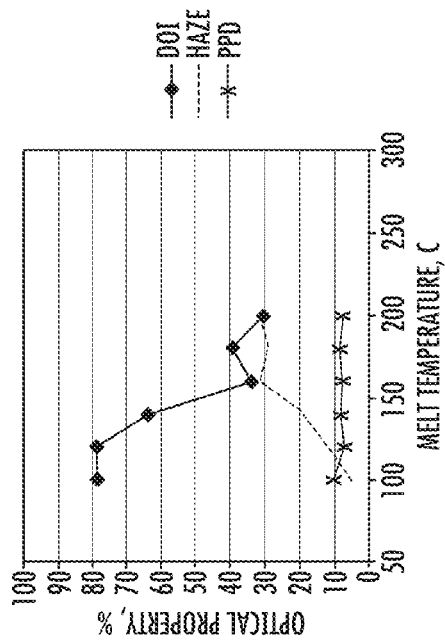
Figure 7B:
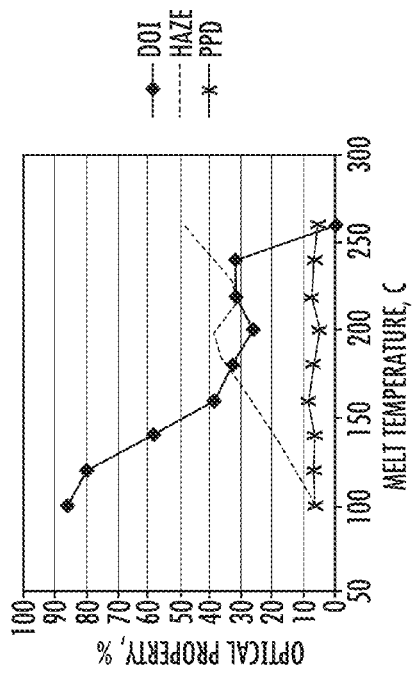
Figure 7C:
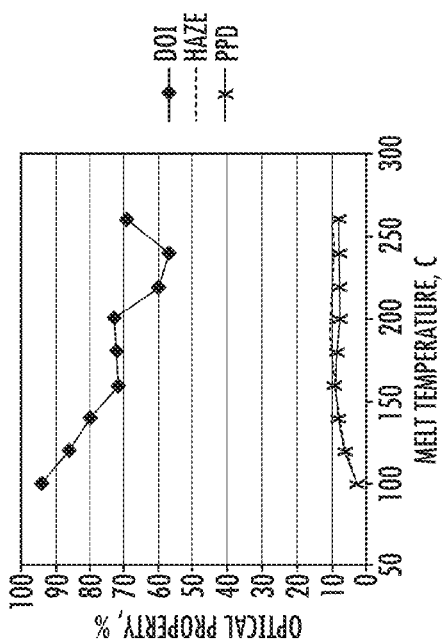
Figure 7D:
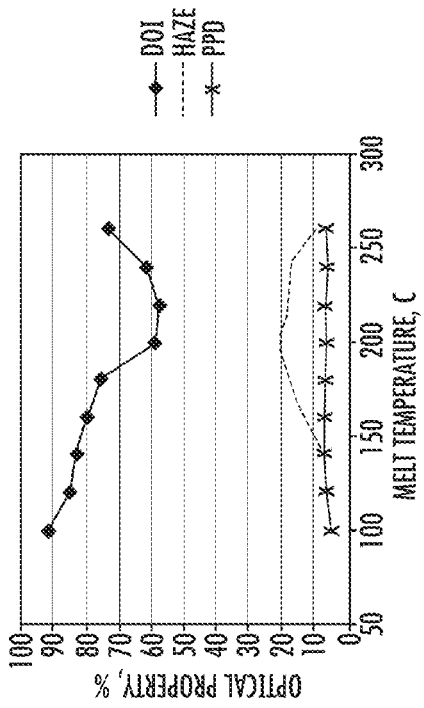

FIGS. 7A to 7D show optical results from etched surfaces generated using microencapsulated beads of Example 1 having a polymer core and a lower melting polymer shell. FIG. 7A used a 6 wt % polyester (P) shell over a PMMA core. FIG. 7B used a 12 wt % polyester (P) shell over a PMMA core. FIG. 7C used a 6 wt % polyester epoxy hybrid (PEH) shell over a PMMA core. FIG. 7D used a 12 wt % polyester epoxy hybrid (PEH) shell over a PMMA core. These data show thermal processing widows for microencapsulated particles, which are significantly wider than non-encapsulated particles (150-250° C.) without loss of coating porosity at the highest temperatures (DOI does not elevate at the highest temperatures). The powders with 12% shell vs. 6% shell demonstrate lower DOI values, indicating that modification of the ratio of shell-to-core is a viable method to control optical properties. In this experiment, a large shell weight percentage would leave a larger footprint (i.e., FIG. 1; 130) on heating and provide greater reduction in DOI.

Haze increased with temperature for all four powder formulations, see FIG. 7C, and at temperatures greater than 150° C., haze was about 20 to about 30% for 12% encapsulated beads and about 10 to about 20% for 6% encapsulated beads. The masks formed from microencapsulated particles containing less shell were significantly lower in haze than the shell masks having a higher weight of shell polymer, indicating shell thickness can be used to control both DOI and haze.

PPD was not as readily predictable versus temperature as compared to haze and DOI, see FIG. 7B. However, all PPD values were relatively small at less than 8% indicating that small features were achieved with microencapsulation due to small footprints and small PMMA beads. Somewhat larger % PPD was seen for the polyester compared to the polyester epoxy hybrid material regardless of the amount of shell, indicating the polyester is either more acid resistant or forms a larger footprint compared to the polyester epoxy hybrid. Lower PPD values are predicted for particles with smaller core diameters and shells. Temperature versus optical properties data is listed in Table 3 for micro-encapsulated (ME) beads.

Example 4

Prophetic

Surface Treated Microencapsulated Particles

Example 3 can be repeated with the exception that the microencapsulated particles only are treated with a silica flow aid as in Example 2 in amounts of from 0.1 to 5 wt %, 0.5 to 3 wt %, and like embodiments, including intermediate values and ranges, based on the weight of the microencapsulated powder. The resulting etched glass surfaces can have improved optical properties as disclosed and demonstrated herein.

The disclosure has been described with reference to various specific embodiments and techniques. However, many variations and modifications are possible while remaining within the scope of the disclosure.

TABLE 3

Microencapsulated Beads for Heat Temperature Series.

| 2 × 2" Sample ID | Bead ID | Heat Temp. (° C.) | HF (M) | $H_2SO_4$ (M) | Total Acidity (M) | Etch Time (sec) | PPD | Haze | DOI |
|---|---|---|---|---|---|---|---|---|---|
| A | 6% P | 100 | 5 | 6 | 11 | 30 | 2.39 | 1.33 | 94 |
| B | 6% P | 120 | 5 | 6 | 11 | 30 | 6.21 | 6.91 | 86.1 |

TABLE 3-continued

Microencapsulated Beads for Heat Temperature Series.

| 2 × 2" Sample ID | Bead ID | Heat Temp. (° C.) | HF (M) | H$_2$SO$_4$ (M) | Total Acidity (M) | Etch Time (sec) | PPD | Haze | DOI |
|---|---|---|---|---|---|---|---|---|---|
| C | 6% P | 140 | 5 | 6 | 11 | 30 | 7.68 | 6.74 | 79.7 |
| D | 6% P | 160 | 5 | 6 | 11 | 30 | 9.01 | 8.31 | 71.6 |
| E | 6% P | 180 | 5 | 6 | 11 | 30 | 8.46 | 10.8 | 71.9 |
| F | 6% P | 200 | 5 | 6 | 11 | 30 | 7.73 | 10.8 | 73.1 |
| G | 6% P | 219 | 5 | 6 | 11 | 30 | 7.77 | 8.96 | 60.4 |
| H | 6% P | 240 | 5 | 6 | 11 | 30 | 8.12 | 9.74 | 57.2 |
| I | 6% P | 260 | 5 | 6 | 11 | 30 | 8.18 | 10.8 | 69.3 |
| J | 12% P | 60 | 5 | 6 | 11 | 30 | — | 0.13 | 91.9 |
| K | 12% P | 70 | 5 | 6 | 11 | 30 | — | 0.08 | 88.5 |
| L | 12% P | 80 | 5 | 6 | 11 | 30 | — | 0.26 | 97.8 |
| M | 12% P | 90 | 5 | 6 | 11 | 30 | — | 0.77 | 97.9 |
| N | 12% P | 100 | 5 | 6 | 11 | 30 | — | 0.77 | 97.3 |
| O | 12% P | 110 | 5 | 6 | 11 | 30 | — | 2.77 | 95.9 |
| P | 12% P | 100 | 5 | 6 | 11 | 30 | 9.44 | 4.15 | 77.9 |
| Q | 12% P | 120 | 5 | 6 | 11 | 30 | 6.67 | 10.7 | 78.3 |
| R | 12% P | 140 | 5 | 6 | 11 | 30 | 7.08 | 18.2 | 63.7 |
| S | 12% P | 160 | 5 | 6 | 11 | 30 | 7.02 | 30.8 | 33.3 |
| T | 12% P | 180 | 5 | 6 | 11 | 30 | 7.61 | 29.2 | 39.3 |
| U | 12% P | 200 | 5 | 6 | 11 | 30 | 6.66 | 30.8 | 30.2 |
| V | 6% PE | 100 | 5 | 6 | 11 | 30 | 4.93 | 2.91 | 91.6 |
| W | 6% PE | 120 | 5 | 6 | 11 | 30 | 6.35 | 5.56 | 85.1 |
| X | 6% PE | 140 | 5 | 6 | 11 | 30 | 6.47 | 7.39 | 83.2 |
| Y | 6% PE | 160 | 5 | 6 | 11 | 30 | 6.46 | 12.4 | 80.2 |
| Z | 6% PE | 180 | 5 | 6 | 11 | 30 | 6.37 | 17.3 | 76.1 |
| AA | 6% PE | 200 | 5 | 6 | 11 | 30 | 6.39 | 20.9 | 59.2 |
| BB | 12% PE | 100 | 5 | 6 | 11 | 30 | 6.15 | 5.98 | 86.6 |
| CC | 12% PE | 120 | 5 | 6 | 11 | 30 | 6.42 | 13.2 | 79.6 |
| DD | 12% PE | 140 | 5 | 6 | 11 | 30 | 6.79 | 19.8 | 58.8 |
| EE | 12% PE | 160 | 5 | 6 | 11 | 30 | 8.74 | 25.2 | 39.1 |
| FF | 12% PE | 180 | 5 | 6 | 11 | 30 | 7.17 | 36.8 | 32.9 |
| GG | 12% PE | 200 | 5 | 6 | 11 | 30 | 5.36 | 39.2 | 26.1 |

What is claimed is:

1. A method of making an article having a textured glass surface, comprising:
attaching microencapsulated particles having a core and a shell to a portion of a glass surface of the article comprising depositing the microencapsulated particles on the glass surface and then thermalizing the attached particles at a temperature at or above the melt temperature of the shell and below the melt temperature of the core; and
contacting the glass surface having the attached microencapsulated particles with an etchant to form the textured surface.

2. The method of claim 1 wherein the microencapsulated particles comprise a mononuclear particle, a polynuclear particle, a matrix particle, combinations thereof, or mixtures thereof.

3. The method of claim 1 wherein the microencapsulated particles, prior to attachment, comprise a mononuclear particle having a core and a shell, the core melts at a higher temperature and has a higher acid resistance compared to the shell.

4. The method of claim 3 wherein the core and shell can each independently comprise at least one of a polymer, a wax, or a combination thereof.

5. The method of claim 1 further comprising cooling the thermalized particulated surface.

6. The method of claim 1 wherein the microencapsulated particles further comprises at least one of a surface charge modifying component, a flow aid surface modifying component, or a combination thereof.

7. The method of claim 1 wherein the microencapsulated particles, after attachment, comprise a particle comprising a core and a shell, the thickness of the shell on the core being substantially diminished or extinguished, and redistributed after attachment to the glass surface and thermalization to: between the deposited particles; between the deposited particles and the surface; or a combination thereof.

8. The method of claim 1 wherein the attaching is accomplished electrostatically.

9. The method of claim 8 wherein electrostatically attaching the microencapsulated particles to a portion of a glass surface of the article comprises charging the microencapsulated particles, charging the glass surface, or a combination thereof.

10. The method of claim 1 wherein the glass surface comprises at least one of a soda lime silicate glass, an alkaline earth aluminosilicate glass, an alkali aluminosilicate glass, an alkali borosilicate glass, a boroaluminosilicate glass, or a combination thereof, the particles are comprised of at least one wax, polymer, or a combination thereof, and the etchant comprises at least one acid selected from HF, H$_2$SO$_4$, HCl, HNO$_3$, H$_3$PO$_4$, or a combination thereof.

11. The method of claim 1 wherein contacting comprises exposing the glass surface having the attached particles to the etchant for about 1 second to about 30 minutes, and in the presence of a surfactant.

12. The method of claim 1 wherein the attached microencapsulated particles have a D$_{50}$ diameter of from about 1 to about 30 micrometers, a shell glass transition temperature (T$_g$) of from about 25 to about 200° C., and a core glass T$_g$ of from greater than the shell T$_g$.

13. The method of claim 1 wherein the attached microencapsulated particles on the surface comprise from a monolayer to a multi-layer of particles, the layer having a dry thickness of from about 1 to about 200 micrometers.

14. The method of claim 1 further comprising treating the resulting textured surface with a low-surface energy fluorosilane coating.

15. The method of claim 1 further comprising washing the resulting textured surface, chemically strengthening the textured surface, or a combination thereof.

16. The method of claim 1 further comprising, prior to etching, contacting at least another surface of the article with a removable, etch-resistant protective layer.

* * * * *